(12) United States Patent
O'Connell et al.

(10) Patent No.: US 11,367,361 B2
(45) Date of Patent: Jun. 21, 2022

(54) EMULATING UNMANNED AERIAL VEHICLE (UAV)

(71) Applicant: Kyndryl, Inc., New York, NY (US)

(72) Inventors: Brian M. O'Connell, Research Triangle Park, NC (US); James E. Bostick, Austin, TX (US); Martin G. Keen, Research Triangle Park, NC (US); John M. Ganci, Jr., Durham, NC (US)

(73) Assignee: Kyndryl, Inc., New York, NY (US)

( * ) Notice: Subject to any disclaimer, the term of this patent is extended or adjusted under 35 U.S.C. 154(b) by 520 days.

(21) Appl. No.: 16/282,355

(22) Filed: Feb. 22, 2019

(65) Prior Publication Data

US 2020/0273353 A1 Aug. 27, 2020

(51) Int. Cl.
*G08G 5/00* (2006.01)
*G01C 21/34* (2006.01)
*B64C 39/02* (2006.01)
*G05D 1/10* (2006.01)
*G02B 30/56* (2020.01)

(52) U.S. Cl.
CPC ......... *G08G 5/0069* (2013.01); *B64C 39/024* (2013.01); *G01C 21/3407* (2013.01); *G02B 30/56* (2020.01); *G05D 1/101* (2013.01); *G08G 5/0039* (2013.01); *B64C 2201/141* (2013.01)

(58) Field of Classification Search
None
See application file for complete search history.

(56) References Cited

U.S. PATENT DOCUMENTS

| | | | |
|---|---|---|---|
| 8,930,058 B1 * | 1/2015 | Quist | G05D 1/0221 |
| | | | 701/23 |
| 9,026,272 B2 * | 5/2015 | Kokkeby | G05D 1/0094 |
| | | | 701/3 |
| 9,405,181 B2 * | 8/2016 | Wong | G03B 21/28 |
| 9,477,230 B2 * | 10/2016 | Sastre I Sastre | G01C 21/04 |
| 9,804,596 B1 | 10/2017 | Slavia | |
| 10,078,338 B2 * | 9/2018 | Smartt | G05D 1/0285 |
| 10,112,712 B1 * | 10/2018 | Gentry | G08G 5/0091 |
| 10,112,728 B2 * | 10/2018 | Evans | G08G 5/0013 |

(Continued)

FOREIGN PATENT DOCUMENTS

CN 206171831 5/2017

OTHER PUBLICATIONS

P. Mell, et al. "*The NIST Definition of Cloud Computing*", NIST Special Publication 800-145, Sep. 2011, Gaithersburg, MD.

(Continued)

*Primary Examiner* — Kevin P Mahne
*Assistant Examiner* — Tischi Balachandra
(74) *Attorney, Agent, or Firm* — Ken Han; George S. Blasiak; Heslin Rothenberg Farley & Mesiti PC

(57) ABSTRACT

Methods, computer program products, and systems are presented. The method computer program products, and systems can include, for instance: examining data specifying a plurality of alternative candidate routes for travel by an unmanned aerial vehicle (UAV) from a current location of the UAV to a destination location; selecting one of the alternative candidate routes as a selected route for travel by the UAV; and controlling the UAV so that while the UAV travels along the selected route the UAV emulates a ground based vehicle (GBV).

20 Claims, 11 Drawing Sheets

(56) References Cited

U.S. PATENT DOCUMENTS

| | | | | |
|---|---|---|---|---|
| 10,152,059 B2* | 12/2018 | Banerjee | | G06T 7/70 |
| 10,272,921 B2* | 4/2019 | Edgington | | B60W 40/08 |
| 10,275,098 B1* | 4/2019 | Clements | | G02B 30/56 |
| 10,281,927 B2* | 5/2019 | Switkes | | G08G 1/166 |
| 10,317,904 B2* | 6/2019 | Tu | | B64C 39/024 |
| 10,474,166 B2* | 11/2019 | Switkes | | G05D 1/0293 |
| 10,481,614 B2* | 11/2019 | Switkes | | B60W 30/165 |
| 10,586,201 B2* | 3/2020 | Gil | | B65G 1/0435 |
| 10,643,346 B2* | 5/2020 | Huber | | G05D 1/0094 |
| 10,789,567 B1* | 9/2020 | Ur | | G06Q 10/0832 |
| 10,955,838 B2* | 3/2021 | Balachandran | | G06F 9/52 |
| 10,963,749 B2* | 3/2021 | Corby, Jr. | | G06K 9/6267 |
| 2005/0264858 A1* | 12/2005 | Vesely | | H04S 7/302 |
| | | | | 359/13 |
| 2006/0074557 A1* | 4/2006 | Mulligan | | G05D 1/0094 |
| | | | | 701/13 |
| 2007/0193798 A1* | 8/2007 | Allard | | G05D 1/0061 |
| | | | | 180/169 |
| 2012/0314021 A1* | 12/2012 | Tsang | | H04N 5/89 |
| | | | | 348/40 |
| 2016/0033855 A1* | 2/2016 | Wong | | G03B 21/62 |
| | | | | 353/13 |
| 2016/0196756 A1* | 7/2016 | Prakash | | G08G 5/025 |
| | | | | 701/3 |
| 2016/0306323 A1* | 10/2016 | Thomas | | G02B 30/56 |
| 2016/0349746 A1* | 12/2016 | Grau | | G05D 1/0094 |
| 2017/0242263 A1* | 8/2017 | Raymond | | B42D 25/324 |
| 2017/0251633 A1* | 9/2017 | Womble | | A01K 5/02 |
| 2017/0293259 A1* | 10/2017 | Ochiai | | G02B 3/0006 |
| 2018/0129164 A1* | 5/2018 | Chu | | G02B 30/56 |
| 2018/0284693 A1* | 10/2018 | Sung | | G03H 1/2205 |
| 2018/0312274 A1* | 11/2018 | Kessler | | G01S 19/14 |
| 2018/0365908 A1* | 12/2018 | Liu | | G05D 1/0044 |
| 2019/0043370 A1* | 2/2019 | Mulhall | | B64D 1/08 |
| 2019/0258246 A1* | 8/2019 | Liu | | G05D 1/0027 |
| 2019/0366557 A1* | 12/2019 | Gewickey | | G06N 5/046 |
| 2020/0020226 A1* | 1/2020 | Stenneth | | G06K 9/00845 |
| 2020/0033886 A1* | 1/2020 | Meinecke | | G05D 1/0246 |
| 2020/0065590 A1* | 2/2020 | Carmichael | | B64D 47/08 |
| 2020/0103670 A1* | 4/2020 | Cole | | G03H 1/2294 |
| 2020/0168138 A1* | 5/2020 | Yoon | | G06F 3/014 |
| 2021/0129982 A1* | 5/2021 | Collins | | B64C 39/024 |
| 2022/0026736 A1* | 1/2022 | Miller | | H04N 9/3138 |

OTHER PUBLICATIONS

S. Toyohara, "[Poster] ARial Texture: Dynamic Projection Mapping on Drone Propellers," 2017 IEEE International Symposium on Mixed and Augmented Reality (ISMAR-Adjunct), Nantes. 2017, pp. 206-211.

* cited by examiner

EMULATING UNMANNED AERIAL VEHICLE (UAV)

BACKGROUND

Location based services (LBS) are software services that use location data to control functionality of computer systems LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WI-FI based locating technologies, and other technologies. One example of an LBS is a location based messaging services wherein notifications and other messages to users can be in dependence on the respective locations of the users.

Autonomous vehicles are automobiles that have the ability to operate and navigate without human input. Autonomous vehicles use sensors, such as radar, LIDAR, global positioning systems, and computer vision, to detect the vehicle's surroundings. Advanced computer control systems interpret the sensory input information to identify appropriate navigation paths, as well as obstacles and relevant signage. Some autonomous vehicles update map information in real time to remain aware of the vehicle's location even if conditions change or the vehicle enters an uncharted environment.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

SUMMARY

Shortcomings of the prior art are overcome, and additional advantages are provided, through the provision, in one aspect, of a method. The method can include, for example: examining data specifying a plurality of alternative candidate routes for travel by an unmanned aerial vehicle (UAV) from a current location of the UAV to a destination location; selecting one of the alternative candidate routes as a selected route for travel by the UAV; and controlling the UAV so that while the UAV travels along the selected route the UAV emulates a ground based vehicle (GBV).

In another aspect, a computer program product can be provided. The computer program product can include a computer readable storage medium readable by one or more processing circuit and storing instructions for execution by one or more processor for performing a method. The method can include, for example: examining data specifying a plurality of alternative candidate routes for travel by an unmanned aerial vehicle (UAV) from a current location of the UAV to a destination location; selecting one of the alternative candidate routes as a selected route for travel by the UAV; and controlling the UAV so that while the UAV travels along the selected route the UAV emulates a ground based vehicle (GBV).

In a further aspect, a system can be provided. The system can include, for example a memory. In addition, the system can include one or more processor in communication with the memory. Further, the system can include program instructions executable by the one or more processor via the memory to perform a method. The method can include, for example: examining data specifying a plurality of alternative candidate routes for travel by an unmanned aerial vehicle (UAV) from a current location of the UAV to a destination location; selecting one of the alternative candidate routes as a selected route for travel by the UAV; and controlling the UAV so that while the UAV travels along the selected route the UAV emulates a ground based vehicle (GBV).

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
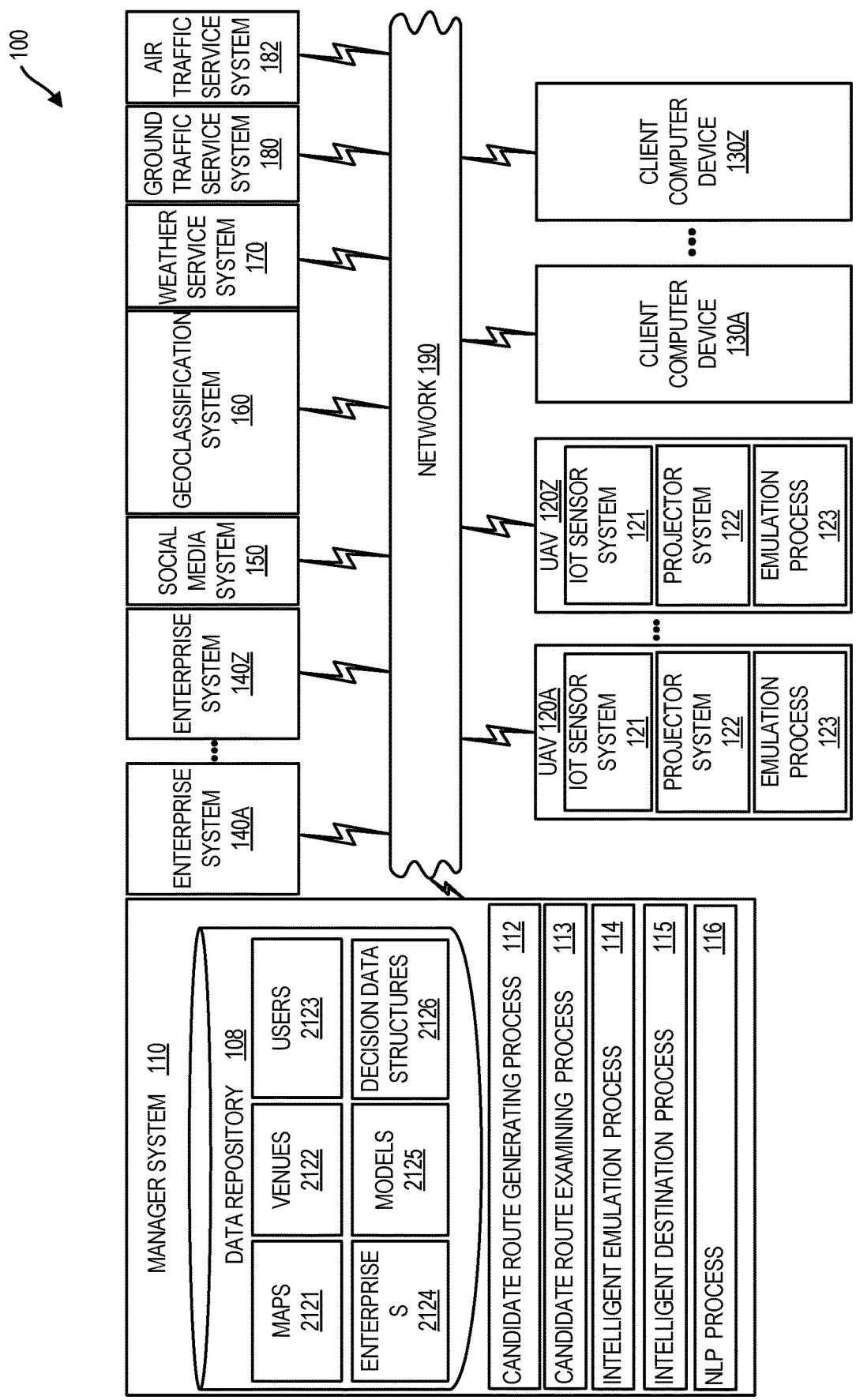
FIG. 1 is a block diagram of a system having a manager system, a plurality of unmanned aerial vehicles (UAVs), a plurality of client computer devices, a plurality of enterprises, a social media system, a geo-classification system, a weather service system, a ground traffic service system, and an air traffic service system in communication via a network according to one embodiment.

System 100 for use in controlling an unmanned aerial vehicle (UAV) is shown in FIG. 1. System 100 can include manager system 110 having an associated data repository 108, UAVs 120A-120Z, client computer devices 130A-130Z, enterprise systems 140A-140Z, social media system 150, geo-classification system 160, weather service system 170, ground traffic service system 180, and air traffic service system 182. Manager system 110, UAVs 120A-120Z, client computer devices 130A-130Z, enterprise systems 140A-140Z, social media system 150, geo-classification system 160, weather service system 170, ground traffic service system 180, and air traffic service system 182 can be in communication with one another via network 190. Network 190 may be a physical network or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network. System 100 can include numerous devices which can be computing node based devices connected by and in communication with one another via network 190.

According to one embodiment, each of manager system 110, UAVs 120A-120Z, client computer devices 130A-130Z, enterprise systems 140A-140Z, social media system 150, geo-classification system 160, weather service system 170, ground traffic service system 180, and air traffic service system 182 can be external to and remote from one another. According to one embodiment, one or more of manager system 110, UAVs 120A-120Z, client computer devices 130A-130Z, enterprise systems 140A-140Z, social media system 150, geo-classification system 160, weather service system 170, ground traffic service system 180, and air traffic service system 182 can be collocated with one another.

UAVs 120A-120Z can respectively include various systems. Each UAV of UAVs 120A-120Z can include an IoT sensor system 121 for sensing attributes of surroundings of a UAV and projector system 122 can project light patterns, e.g. 3D holographic projection light patterns according to one embodiment.

Embodiments herein recognize that proliferation of UAVs have the potential to have a deleterious effect on an environment including aesthetic degradation of an environment as well as safety degradation of an environment. Embodiments herein can include a UAV capable of operating in a ground based vehicle (GBV) emulation mode, in which the UAV emulates GBV, such as an autonomous ground based vehicle or a ground based vehicle GBV that is not an autonomous vehicle. Emulating the operation GBV, a UAV can conduct a trip from point A to point B without consuming high elevation air space, in which the UAV may be aesthetically unpleasing and/or may pose a safety risk.

Embodiments herein recognize that while it can be advantageous for a UAV to emulate the operation of a GBV, risks can be attendant to such operation. For example, drivers of traditional GBVs sharing the road with UAVs operating in a GBV emulation mode may not recognize the UAV as a GBV and therefore may collide with the UAV operating in a GBV emulation mode, to cause injury to the driver, the driver's vehicle, and/or the UAV. Embodiments herein can feature projector system 122 fixed to a UAV, e.g. UAV 120A as shown in FIG. 1, which is configured to project a light pattern so that the UAV emulates the appearance of a GBV. The GBV emulation mode herein can include a UAV emulating the operation of a UAV following rules of the road and can also include the UAV emulating the appearance of a GBV. For example, a UAV herein can include a projector system 122 that facilitates the UAV projecting light externally therefrom to enlarge the perceived size of the UAV so that the UAV emulates the appearance of a GBV. In some embodiments a projected light pattern can be projected with sufficient resolution so that perceivable shape features are projected, the perceivable shape features being projected to allow a user to discern a vehicle type (e.g. between four wheel and two wheel) associated to the particular shape pattern.

Projector systems 122 of respective UAVs 120A-120Z can include one or more light projectors. Light projectors herein, e.g. projectors of projector system 122 of UAVs 120A-120Z and projectors 145A-145C associated to respective enterprise systems 140A-140Z can according to one embodiment be holographic projectors that project holographic images to define three-dimensional (3D) holographic image projections.

A hologram can include a photographic recording of a light field. A hologram can include an encoding of a light field as an interference pattern of a random variations and opacity, density, or surface profile of a photographic medium. When lit under appropriate conditions the interference pattern diffracts the light into reproduction of the original light field and objects that were in the light field appear by the appearance of being present exhibiting, e.g. visual depth ques such as parallax and prospective. Holography can include use of laser light for activating a recorded hologram. In some embodiments, where a projector includes suitable optics, non-laser light may be utilized.

Various materials can be used as a recording medium for recording a hologram. According to one embodiment, silver halide photographic emulsion having a high concentration of light reactive grains can be utilized. For recording a hologram an interference pattern between light waves can be imprinted on a recording medium for recording. The interference pattern can be regarded to be an encoded version of a light field. The recorded light pattern can define a diffraction grating. Another recording medium that can be utilized can include, e.g. dichromated gelatin, photoresists, photothermal plastics, photopolymers, and photorefractives.

For projecting a holographic image such as a 3D holographic image, a hologram recorded on a recording medium can be illuminated by a laser beam having characteristics in common with a reference beam used to record the hologram. Based on such illumination a reconstruction of an original object wavefront can be provided. In the case that several objects were present when a hologram was recorded, the reconstructed objects can move relative one another, i.e. can exhibit parallax in the same manner as the original objects. Projected holograms can include, e.g. a volume hologram and/or a rainbow hologram.

Social media system 150 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment. During a process of registration wherein a user of system 100 registers as a registered user of system 100, a user sending registration data can send with permission data defining the registration data a permission that grants access by manager system 110 to data of the user within social media system 150. On being registered, manager system 110 can examine data of social media system 150 e.g. to determine whether first and second users are in communication with one another via a messaging system of social media system 150. A user can enter registration data using a user interface displayed on a client computer device of client computer devices 130-130Z. Entered registration data can include e.g. name, address, social media account information, other contact information, biographical information, background information, preferences information, and/or permissions data e.g. can include permissions data allowing manager system 110 to query data of a social media account of a user provided by social media system 150 including messaging system data and any other data of the user. When a user opts-in to register into system 100 and grants system 100 permission to access data of social media system 150, system 100 can inform the user as to what data is collected and why, that any collected personal data may be encrypted, that the user can opt out at any time, and that if the user opts out, any personal data of the user is deleted.

Geo-classification system 160 can associate venues to spatial coordinate ranges associated to the venues. Geo-classification system 160 can include enhanced spatial maps pre-marked with tags to indicate uses and other attributed associated with geospatial features. Geospatial features can include roadways marked with tags to specify e.g. coordinates of road lanes, coordinates of road shoulders, coordinates of intersections, coordinates of road infrastructure such as guardrails and signs, classifications for traffic lights, on ramp and off ramp coordinates and the like. Geospatial features can include venues having associated venue areas including venue building areas and/or associated venue parking areas. An enhanced map can include tag specifying usage classifications of venues, e.g. residential, business, public and the like. An enhanced map can be tagged to tag features of a map including e.g. roads, bodies of water and infrastructure features such as building walls (exterior and interior) defining enterprise venues. In some cases an enhanced map can be tagged so that that different parts of a building are tagged differently, e.g. a doorway can be tagged differently from a conference room. Geo-classification system 160 can provide data tags associated to locations that specify uses associated with various locations. Geo-classification system 160 can cognitively map venues identified by venue identifiers, e.g. names, addresses, classifications, and the like, to coordinate location ranges associated to the various venues. Accordingly, manager system 110 querying geo-classification system 160, with location data in the form of coordinate location data, can return an identifier of a venue. Further, geo-classification system 160 can cognitively map venues that are listed in geo-classification system 160 with uses associated with such venues, e.g. whether such venues are for residential use or business use and include a variety of additional or alternative use classifications, e.g. public use, roadway use, waterway use, and the like. An enhanced map can be tagged to tag features of a map, including e.g. roads, bodies of water and venues. Venues can be provided e.g. by open spaces, such as developed open spaces or undeveloped open spaces, buildings such as open roof building or closed roof buildings, and/or open spaces associated to buildings, such as building associated with a parking lot. For each venue, geo-classification system 160 can associate e.g. identifiers for the venue, ranges and coordinate locations associated with the venue, features associated to the venue, such as building infrastructure features, parking lot features, and other features. Geo-classification system 160 according to one embodiment can be provided by GOOGLE MAPS® (GOOGLE MAPS® is a registered trademark of Google, Inc.).

Weather service system 170 can be configured to provide weather data with respect to an area being serviced by system 100. Weather data can include e.g. historical temperature data, precipitation data, wind data and weather event data. Weather data can include e.g. current temperature data, precipitation data, wind data and weather event data. Weather data can include e.g. forecast temperature data, precipitation data, wind data and weather event data. Weather events can include e.g. storms including hurricanes, tornados, fog formations, heat waves and cold waves. Weather service system 170 can store weather data associated to different subareas of an area being serviced by system 100.

Data repository 108 can store various data. In maps area 2121 data repository 108 can store geospatial maps, which can be three-dimensional (3D) geospatial maps for geospatial areas services by system 100. Map data included in maps area 2121 can include metadata tagged maps that have metadata specifying attributes associated with various geospatial areas. Geospatial areas can include roadways marked with metadata tags to specify e.g. coordinates of road lanes, coordinates of road shoulders, coordinates of intersections, coordinates of road infrastructure such as guardrails and signs, classifications for traffic lights, on ramp and off ramp coordinates and the like. Metadata tags can include, e.g. tags that specify whether an area is residential or commercial, used commercial space or unused commercial space, restricted air space or unrestricted air space, and the like. Metadata tags of maps area 2121 can further specify, e.g. population densities associated with numerous other classifications, e.g. whether the space is protected natural environment space subject, e.g. to a government nature protection program.

Data repository 108 in venues area 2122 can store data on venues in a geospatial area of system 100. Venues can be associated to enterprises, e.g. retail or other business enterprises, which enterprises can have associated enterprise systems 140A-140Z. Data repository 108 in venues area 2122 can store data, e.g. on specific spatial attributes associated to the venue, e.g. attributes of a building construction on a venue, e.g. doorway locations, shipping docks, pedestrian sidewalks, pick up and drop off locations, and the like.

Data repository 108 in enterprises area 2124 can store data of registered enterprises of system 100 such as retail enterprises, parcel delivery enterprises, and/or government enterprises who may operate UAVs of UAVs 120A-120Z for providing services to patrons. Registration data for registering an enterprise can include such information as identifiers and address data for UAVs being operated by an enterprise. Thus, data repository 108 in enterprises area 2124 can include identifiers and addresses for UAVs supported by system 100.

Data repository 108 in models area 2125 can store data on, e.g. predictive models used for return of artificial intelligence (AI) action decisions. Models of models area 2125 can include, e.g. predictive models that are trained using machine learning training processes.

Data repository 108 in decision data structures area 2126 can store various decision data structures for return of action decisions. Decision data structures can include, e.g. decision tables and/or decision trees.

Manager system 110 can run various processes, e.g. including candidate route generating process 112, candidate route examining process 113, intelligent emulation process 114, intelligent destination process 115, and NLP process 116.

Manager system 110 running candidate route generating process 112 can generate a plurality candidate routes in response to a trip request in which a trip to be performed by UAV, e.g. UAV 120A is requested. Manager system 110 running candidate route generating process 112 can include manager system 110 querying ground traffic system 180 and air traffic service system 182 with data specifying a current UAV location and a destination UAV location for a current trip. In response to received query data ground traffic service system 180 can return data specifying alternative ground based routes and air traffic service system 182 in response to received queries can return aerial based alternative routes.

According to one embodiment as set forth herein, system 100 can be configured so that UAVs 120A-120Z are capable of operating in a ground based vehicle emulation mode, in which they emulate a ground based vehicle (GBV).

Manager system 110 running candidate route generating process 112 can generate candidate routes that define hybrid candidate routes. A hybrid candidate route herein can be a route that includes one or more route segment that is aerial based and one or more route segment that is ground based. UAVs 120A-120Z herein can be capable of operating in a ground based vehicle operating mode and as such UAVs 120A-120Z herein can be capable of embarking on hybrid routes, in which one or more route segment is an aerial based route and one or more route segment is a ground based route.

Manager system 110 running candidate route examining process 113 can examine candidate routes generated by the running of candidate route generating process 112. Manager system 110 running candidate route examining process 113 can, according to one embodiment, apply a scoring formula in which multiple factors are considered for return of a scoring value associated to a candidate route. Factors can include, e.g. a time factor, an energy cost factor, an aesthetic factor, and/or a safety factor. Manager system 110 running candidate route examining process 113 can select one route out of a set of candidate routes based on which route returns the highest scoring value upon application of a candidate route scoring formula.

Manager system 110 running intelligent emulation process 114 can include manager system 110 emulating a ground based vehicle (GBV). For emulation of a GBV, manager system 110 can control a UAV, e.g. UAV 120A, so that UAV 120A emulates operation of a GBV. A UAV, e.g. UAV 120A, emulating operation of a GBV can include a UAV adhering to applicable traffic rules, e.g. rules of a road as are adhered to by a GBV, either a human driven GBV or an autonomous GBV. For adhering to the rules of a roadway, a UAV can, e.g. stay within marked lanes of a roadway, stop at red lights of traffic lights, stop at stop signs, yield to autonomous and non-autonomous vehicles having the right of way, yield to pedestrians, and where necessary can employ collision avoidance maneuvers.

A UAV herein according to one embodiment can emulate a GBV by maintaining a flight elevation at a fixed elevation i.e. at a fixed distance from a ground roadway elevation, e.g. at a certain elevation of between about 0.3M and about 3M off the ground, according to one embodiment. According to one embodiment, the fixed flight elevation can be characterized by a low elevation and a high elevation of the UAV over a course of travel of more than 10M having a difference of no more than about 1M, and the elevation of the UAV being less than about 3M. According to one embodiment, the fixed flight elevation can be characterized by a low elevation and a high elevation of the UAV over a course of travel of more than 10M having a difference of no more than about 0.5M, and the elevation of the UAV being less than about 2M. According to one embodiment, the fixed flight elevation can be characterized by a low elevation and a high elevation of the UAV over a course of travel of more than 10M having a difference of no more than about 0.5M, and the elevation of the UAV being less about 1M. A UAV traveling at an elevation of under about 2M within common elevations observed for common GBVs can augment the capacity of the UAVE to emulate the appearance of a GBV particularly when the GBV projects a light pattern. Referring to FIG. 1, UAVs 120A-120Z can respectively run emulation process 123 which facilitates ground based navigation control on the part of respective UAVs 120A-120Z so that UAVs 120A-120Z can e.g. emulate operations performed by an autonomous ground based vehicle, e.g. can perform turning, stopping, follow applicable traffic rules the rules followed by a GBV e.g. staying in lane, stopping at a stop sign, stopping at an intersection based on a traffic light indicator.

For emulation of a GBV, manager system 110 can control a UAV, e.g. UAV 120A, so that UAV 120A emulates an appearance of a GBV. Manager system 110 running intelligent emulation process 114 can include manager system 110 sending control data to a UAV, e.g. UAV 120A, to control a light pattern projected by the UAV. A projected light pattern can enlarge the apparent size of the UAV so that the UAV thereby emulates the appearance of the GBV. In one embodiment, UAV 120A can have a height dimension of no more than about 1M and a width dimension of no more than about 1M. For emulating appearance of a GBV, a UAV herein can be configured to include projector system 122 that is capable of projecting one or more light pattern. The one or more light pattern can include, e.g. one or more holographic image projection. The one or more light pattern can include, e.g. a plurality of different candidate vehicle emulating light patterns that can be intelligently selected by manager system 110.

Manager system 110 running intelligent emulation process 114 can, according to one embodiment, control a projector system 122 of a UAV, e.g. UAV 120A, so that the UAV projects light so that a UAV has an appearance emulating the appearance of a GBV. According to one embodiment, the projected light pattern can be in the form of a projected holographic image, wherein the holographic image has the appearance of a ground based vehicle.

Manager system 110 running intelligent destination process 115 can control operation of a UAV, e.g. UAV 120A, so that the UAV operates in a specified manner when at a destination. Manager system 110 running intelligent destination process 115 in some embodiments can further control one or more system external to a UAV to facilitate pick up or delivery of an item.

Manager system 110 can run NLP process 116 to process data for preparation of records that are stored in data repository 108 and for other purposes. Manager system 110 can run a Natural Language Processing (NLP) process 116 for determining one or more NLP output parameter of a message. NLP process 116 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 116 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment NLP classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Manager system 110 running NLP process 116 can include manager system 110 returning NLP output parameters in addition to those specification topic and sentiment, e.g. can provide sentence segmentation tags, and part of speech tags. Manager system 110 can use sentence segmentation parameters to determine e.g. that an action topic and an entity topic are referenced in a common sentence for example.

Figure 2:
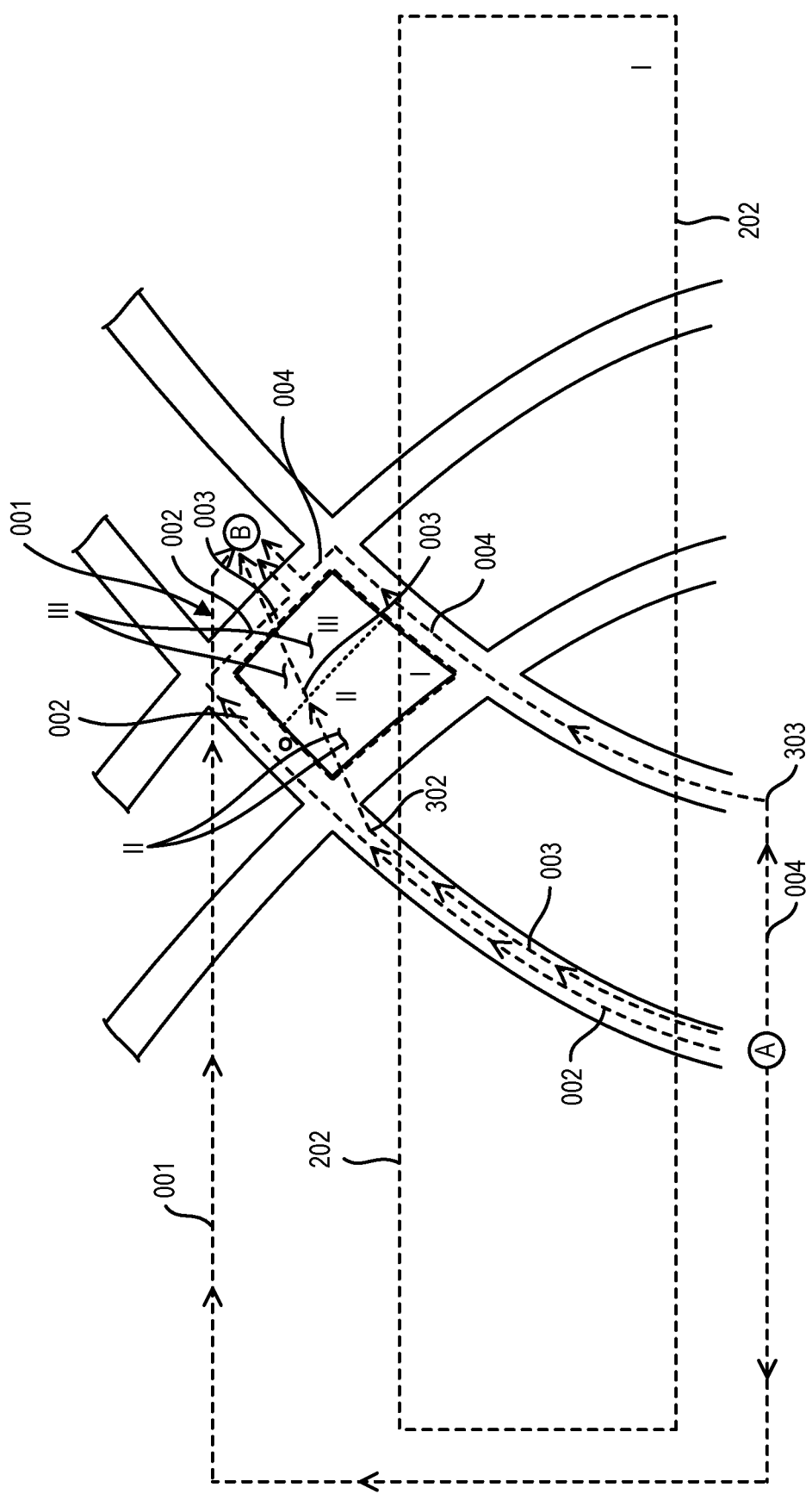
FIG. 2 depicts a roadway that can be navigated by a UAV with use of the system shown in FIG. 1 according to one embodiment.

Additional aspects of manager system 110 running candidate route examining process 113 are explained with reference to FIGS. 2 and 3. Manager system 110 can be in receipt of a trip request in which a UAV is requested to perform a trip to travel from location A to location B as specified in FIG. 2. In FIG. 2, region I having perimeter 202 can be a restricted air space in which the UAV is legally precluded from flying through at an elevation higher than a threshold elevation.

Manager system 110 running candidate route examining process 113 can include manager system 110 examining a plurality of alternative routes from location A to location B. The routes can include, e.g. aerial based routes, ground based routes, or hybrid routes including one or more aerial based route segment and one or more ground based route segment. Referring to FIG. 2, the first candidate route can be route 001 which is an aerial based route in which the UAV can travel in the air in a manner to avoid restricted air space region I, specified by perimeter 202. Route 002 can be a ground based route in which a UAV travels exclusively on the ground in a GBV emulation mode the entire distance from location A to location B. Route 003 can be a hybrid route in which a UAV travels for a first segment in a GBV emulation mode on the depicted roadway until region I is exited and then the UAV travels in the air in an aerial navigation mode the remaining distance to location B. In an aerial navigation mode, UAV can fly at a higher elevation from the ground in accordance with applicable UAV regulations and can navigate in a manner without respect to any roadway rules, e.g. in an aerial navigation mode, a UAV can be capable, e.g. of flying over roads including intersections without stopping.

In further reference to FIG. 2, route 004 can be an alternative hybrid route in which a first route segment is performed in an aerial navigation mode, e.g. moving directly to the right in FIG. 2, for the first segment and the remainder of the route can be performed in a GBV emulation mode, in which the UAV emulates a GBV. FIG. 3 depicts a magnified view of FIG. 3, in which during the performance of a selected route, an alternate route can be selected for replacement of the current route.

Figure 4A:
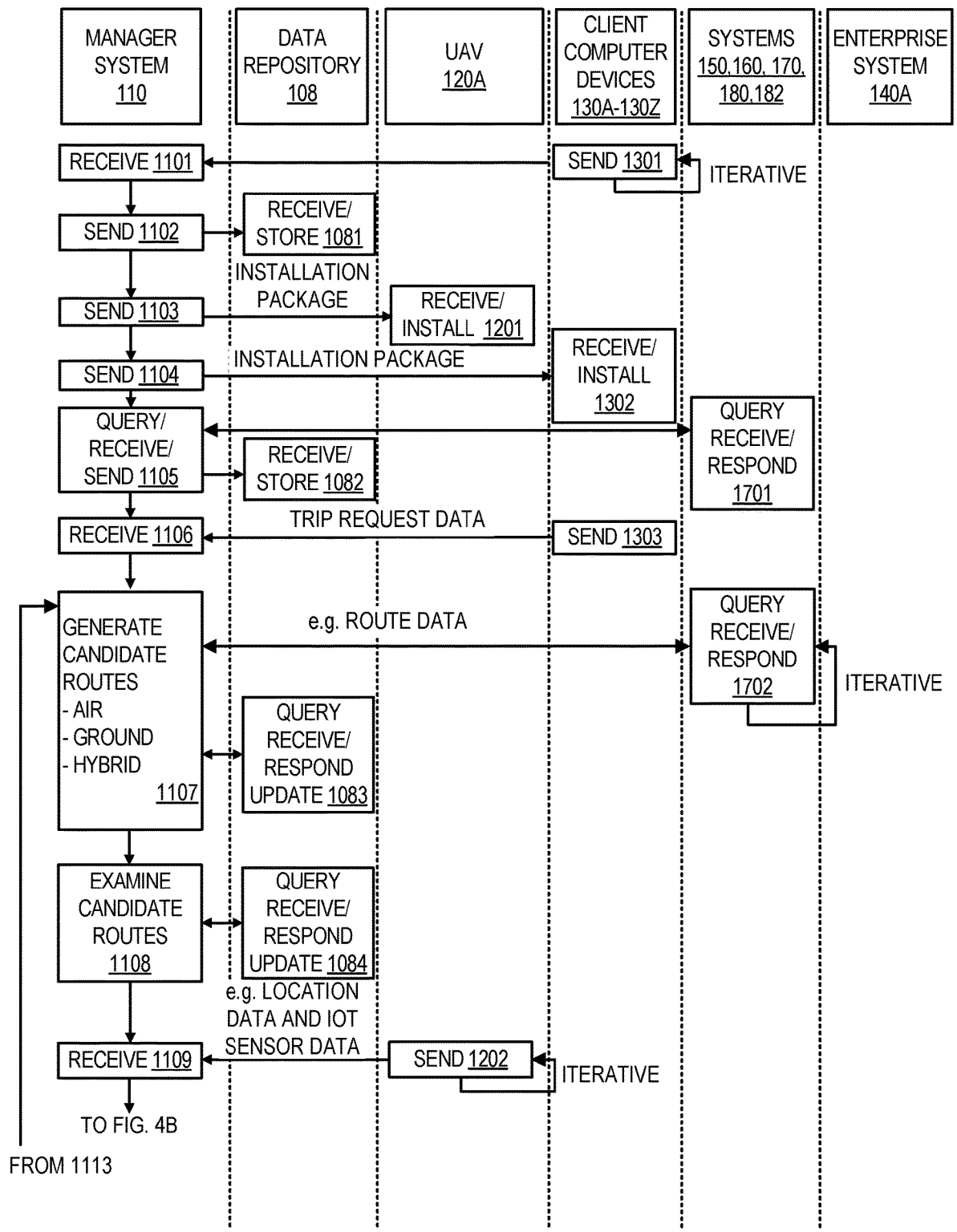
FIGS. 4A-4B is a flowchart depicting a method for performance by manager system interoperating with a UAV, client computer devices, and various systems according to one embodiment.
Figure 4B:
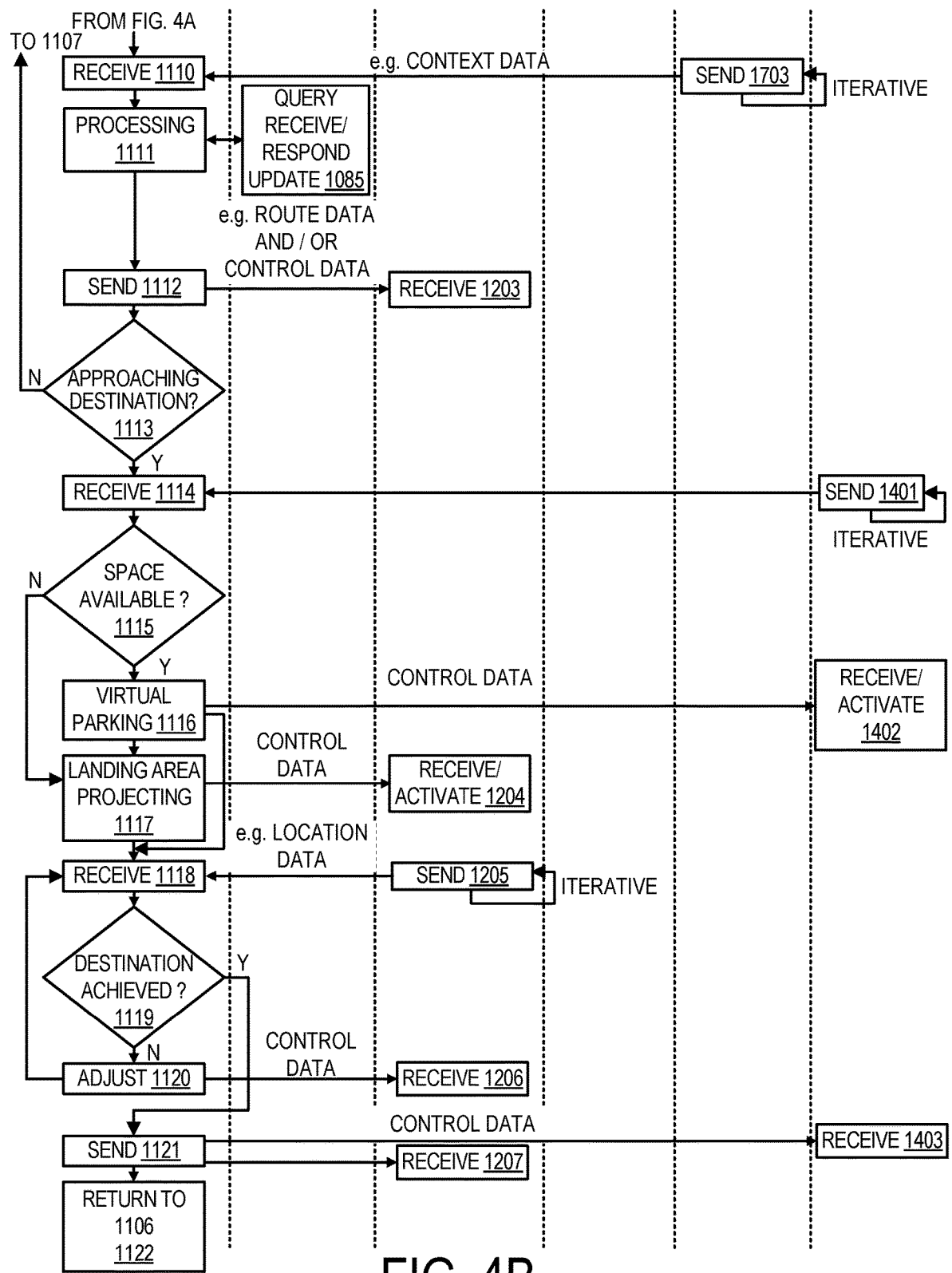

In FIGS. 4A-4B there is shown a flowchart depicting a method for performance by manager system 110 interoperating with UAV 120A, client computer devices 130A-130Z, enterprise system 140A, and systems 150, 160, 170, 180, and 182. At block 1101, manager system 110 can be receiving registration data from client computer devices 130A-130Z. Client computer devices 130A-130Z can be sending registration data at block 1301. Users can be using client computer devices 130A-130Z. Users of client computer devices 130A-130Z can be general users or administrator users who are agents of enterprises. Each enterprise system 140A can be associated with a different enterprise, such as a business enterprise, e.g. a retail enterprise or another type of enterprise such as a government enterprise. Enterprise systems of enterprise systems 140A-140Z can include, e.g. parcel delivery services that deliver items over distances. Registration data sent at block 1301 can include registration data, e.g. to register general users as registered users of system 100 and can also include registration data to register enterprises as registered enterprises of system 100. In response to receipt of registration data at block 1101, manager system 110 can assign a universally unique identifier (UUID) to a general user or to an enterprise. Data repository 108 in users area 2123 can store data on users of system 100 such as general users of system 100 who may use services provided by system 100, e.g. for item delivery.

At block 1102, manager system 110 can send received registration data to data repository 108 for storage by data repository 108 at block 1081. Manager system 110 at block 1103 can send an installation package for receipt and installation by UAV 120A at block 1201. At block 1104, manager system 110 can send an installation package for receipt and installation by client computer devices 130A-130Z at block 1302. The installation package received at block 1201 can include, e.g. libraries and executable code to facilitate UAV 120A functioning to provide services in support of services provided by system 100. Libraries and executable code can be installed for example to facilitate UAV 120A running emulation process 123 described in connection with FIG. 1 that facilitates UAV 120A emulating operation of a GBV adhering to ground based vehicle traffic rules, including such rules as maintaining position within lanes, stopping at stop signs and at traffic intersections, and the like.

The installation package received and installed at block 1302 by client computer devices 130A-130Z can include, e.g. libraries and executable code that facilitate client computer devices 130A-130Z operating in a manner to benefit from services provided by system 100. Libraries and executable code installed at block 1302 can include for example, libraries and executable code that provide user interface functionality on client computer devices 130A-130Z enabling users of client computer devices 130A-130Z, e.g. to request trips by select ones of UAVs 120A-120Z, e.g. for the performance of item delivery or for performance of another specified service in which the UAV of UAVs 120A-120Z is to travel from a first location to a second location.

At block 1105, manager system 110 can query various systems such as social media system 150, geo-classification system 160, weather service system 170, ground traffic service system 180, and air traffic service system 182 for data which is received by the respective systems at block 1701. In response to the data queries received at block 1701, the respective systems 150, 160, 170, 180 and 182 can return data to manager system 110 for receipt by manager system 110 at block 1105. Further at block 1105, manager system 110 can send, for storage by data repository 108 at block 1082, received data. Data received and sent for storage into data repository 108 at block 1105 can include such data as maps data such as metadata tagged maps data, received from geo-classification system 160. Maps data can be stored in maps area 2121 of data repository 108. Data received for storage at block 1105 can also include data from social media system 150, e.g. specifying human population sentiment over a geospatial area services by system 100, data from weather service system 170, e.g. respecting historical trends and average temperatures per calendar dates for a geospatial area services by system 100, data from ground traffic service system 180 regarding, e.g. base line candidate routes, data from air traffic service system 182, e.g. regarding base line air traffic routes for UAVs, and data from enterprise systems 140A-140Z, e.g. for population of data of enterprise venues area 2122 specifying, e.g. loading areas associated to venues. According to one embodiment, manager system 110 at block 1105 can query and receive information from enterprise systems 140A-140Z in addition or alternatively to systems 150, 160, 170, 180, and 182.

At block 1106, manager system 110 can receive trip request data from a client computer device of client computer devices 130A-130Z. The trip request data can specify a request wherein UAV 120A is to travel from location A to location B, e.g. as specified in FIG. 2, wherein at location B the UAV 120A can pick up and/or deliver an item. In response to receipt of trip request data at block 1106, manager system 110 can proceed to block 1107.

At block 1107, manager system 110 can activate candidate route generating process 112 to generate candidate routes. Manager system 110 at block 1107 can be querying data from systems 150, 160, 170, 180, and 182, which data queries can be received and responded to at block 1702. Returned data returned at block 1702 can include, e.g. route data from ground traffic service system 180 and/or air traffic service system 182. Query data received at block 1702 can specify various data such as data specifying a current location for UAV 120A and a destination location for UAV 120A. Manager system 110 can receive ground based traffic routes e.g. exclusively ground based candidate routes from ground traffic service system 180 and can be receiving aerial candidate routes e.g. exclusively aerial candidate routes from air traffic service system 182. For generation of candidate routes, manager system 110 can also perform data queries of data repository 108, for receipt by data repository 108 at block 1083. Such data queries can include data queries of maps area 2121 used by manager system 110 in constructing hybrid routes including one or more ground based segment and one or more aerial based segment. As indicated by block 1083 performed by data repository 108, data repository 108 can be iteratively receiving and responding to data queries from manager system 110 and can be updating data values of data repository 108 based on data received from manager system 110.

Referring to FIG. 2, manager system 110 can generate a plurality of different candidate routes, some of which can be aerial based, some of which can be ground based, and some of which can be hybrid routes having one or more aerial based segment and one or more ground based segment. The candidate routes can include, e.g. aerial based routes that are entirely aerial, ground based routes that are entirely aerial, or hybrid routes including one or more aerial based route segment and one or more ground based route segment. Referring to FIG. 2, the first candidate route can be route 001 which is an aerial based route in which the UAV can travel in the air in a manner to avoid restricted air space region I, specified by perimeter 202. Route 002 can be a ground based route in which a UAV travels exclusively on the ground in a GBV emulation mode the entire distance from location A to location B. Route 003 can be a hybrid route in which a UAV travels for a first segment in a GBV emulation mode on the depicted roadway until region I is exited and then the UAV travels in the air in an aerial navigation mode the remaining distance to location B.

For construction of a hybrid candidate route according to one example, manager system 110 can perform the following process: (i) manager system 110 can identify in a spatial area an interfering restricted air space region impeding an aerial based route between start location A and an end location B; (ii) manager system 110 can identify ground based routes through roadways through the restricted air space region; and (iii) at the point where the restricted air space region is exited manager system 110 can identify a candidate aerial based route segment between the exit point 302 (FIG. 2) and the destination B. On completion of block 1107, manager system 110 can proceed to block 1108.

At block 1108, manager system 110 can examine candidate routes generated at block 1107. Manager system 110 at block 1108 can activate candidate route examining process 113 as shown in FIG. 1. Manager system 110 performing block 1108 can include manager system 110 performing multiple data queries of data repository 108. Data repository 108 can receive and respond to such queries at block 1084. As indicated by block 1084 performed by data repository 108 data repository 108 can be iteratively receiving and responding to data queries from manager system 110 and can be updating data values of data repository 108 based on data received from manager system 110. Manager system 110 performing examination of candidate routes at block 1108 can include manager system 110 applying the formula of Eq. 1.

$$P = F_1 W_1 + F_2 W_2 + F_3 W_3 + F_4 W_4 \qquad \text{(Eq. 1)}$$

Where $F_1$ is a time factor, $F_2$ is an energy cost factor, $F_3$ is an aesthetic factor, and $F_4$ is a safety factor, and where $W_1$-$W_4$ are weights associated with the various factors.

Manager system 110 can apply scoring values according to factor $F_1$ in proportion to a predicted time associated with a route. With an individual route segment identified, manager system 110 can query ground traffic service system 180 or air traffic service system 182 for route data respecting the identified route segments, air or ground.

Manager system 110 applying factor F2 can apply scoring values according to factor F2 in dependence on an expected energy cost associated to a route. Manager system 110 can determine expected energy consumption in dependence on route data received from ground traffic service system 180 and/or air traffic service system 182 and in dependence on specification data associated with a UAV that has been designated for a current trip. Manager system 110 can determine UAV specification data for enterprises area 2124 of data repository 108.

Manager system 110 can apply a scoring value according to factor $F_3$ in dependence on an aesthetic impact of a candidate route. Manager system 110 according to one embodiment can apply higher scoring values where a candidate route has little or no negative aesthetic impact.

According to one embodiment, candidate routes that are exclusively ground based, e.g. conducted in a GBV emulation mode, can be assigned higher values according to aesthetic factor $F_3$ and candidate routes that are all or partially aerial based can be assigned lower scoring values under factor $F_3$.

Scoring values according to factor $F_3$ can be in dependence on an area to be traversed by a candidate route. For example, a route segment through a residential and recreational area can be assigned a lower scoring value according to factor $F_3$ than a candidate route segment through unused commercial space where the route is unlikely to be visually observed by members of the human population.

Manager system 110 applying safety factor $F_4$ can be assigned higher scoring values than the candidate route is expected to be more safe and can apply lower scoring values where the candidate route is expected to be less safe. According to one embodiment, an aerial based route segment through a high population area can be scored lower than an aerial based route through a low population area. Scoring values applied under safety factor $F_4$ can be in dependence on current weather conditions. For example, where data received from ground traffic service system 180 or from weather service system 170 indicates icy road conditions, road based route segments can be assigned lower safety scores.

Additional factors can be built into the scoring formula of Eq. 1. For example, there can be include a transition cost factor $F_5$ which is designed to automatically augment the score of the candidate route which is a continuation of the current route being traveled by UAV 120A in recognition of baseline resource utilization costs associated with the transition to a new route that is not a continuation of the current route.

Manager system 110 at block 1108 can examine returned scoring values P for the various candidate routes examined and can select the candidate route returning the highest score as the established route for the current trip. The selected route established as the established route can be, e.g. an aerial based, road based, or a hybrid air and ground based route. On completion of block 1108, with a current route for a trip established, manager system 110 can proceed to block 1109.

At block 1109, manager system 110 can be receiving from UAV various data such as location data and/or IoT sensor data. UAV 120A can be iteratively sending, e.g. location data and/or IoT sensor data at block 1203. The IoT sensor data sent at block 1203 can include, e.g. camera sensor IoT sensor data, which includes image data specifying the physical surroundings of UAV 120A and its current location. On completion of block 1108, manager system 110 can proceed to block 1110.

At block 1110, manager system 110 can be receiving context data from systems 150, 160, 170, 180, and 182 which can be sent by systems 150, 160, 170, 180, and 182 at block 1704. Data iteratively sent by systems 150, 160, 170, 180, and 182 at block 1704 can include context data. Context data can be data for use by manager system 110, e.g. in scoring candidate routes and/or for use by manager system 110 in returning control data for controlling ground based vehicle emulation attributes of UAV 120A. Context data can include, e.g. from social media system 150, such context data such as social sentiment regarding UAVs, e.g. in the air or on roadways, from geo-classification system 160, updated metadata tags tagging attributes associated with spatial areas being serviced by system 100, from weather service system 170 data respecting, e.g. brightness, darkness, e.g. due to cloud cover, and/or precipitation and from systems 180 and 182 ground or air traffic events. Manager system 110 on completion of block 1110 can proceed to block 1111.

At block 1111, manager system 110 can perform processing of received data received at block 1109 and block 1110 and/or processing previously stored data of data repository 108 for return of control data for control of an emulation attribute of UAV 120A so that UAV in response to the received control data can appropriately emulate operation and/or appearance of a GBV. Manager system 110 performing processing at block 1111 can include manager system 110 activating intelligent emulation process 114 as set forth in FIG. 1. At block 1111, manager system 110 can perform processing of received data received from data repository 108 in response to data queries sent to data repository 108. As indicated by block 1085 performed by data repository 108, data repository 108 can be iteratively receiving and responding to data queries from manager system 110 and can be updating data values of data repository 108 based on data received from manager system 110. Manager system 110 on completion of block 1111 can proceed to block 1112.

At block 1112, manager system 110 can send various data for receipt by UAV 120A at block 1203, the received data at block 1203 by UAV 120A can include, e.g. control data or route data. Control data can be control data to control an emulation attribute of UAV 120A. Route data can include route data that specifies the established route established by manager system 110 at block 1108. Where the specified route data specifies a route that is a continuation of the current route UAV 120A in response to the received route data can continue along the current route. Where the received route data received at block 1203 specifies a new route UAV 120A at block 1203 can commence travelling in accordance with the updated route.

Control data received at block 1203 can be determined according to one embodiment using a decision data structure which maps context data conditions to action decisions. Table A specifies an exemplary decision data structure for return of action decisions to which different sets of control data for sending by manager system 110 at block 1112 can be mapped.

TABLE A

| Row | Condition | Action decision |
|---|---|---|
| 1 | Aerial based route segment active | Ground based vehicle (GBV) emulation mode disabled |
| 2 | Ground based route segment active | GBV emulation mode enabled |
| 3 | Ground based route segment active and IOT camera sensor data from UAV and/or maps data indicates that a frequency of motorcycles | Activate baseline vehicle emulation light pattern |

TABLE A-continued

| Row | Condition | Action decision |
|---|---|---|
| | does not exceed a threshold | |
| 4 | Ground based route segment active and IOT camera sensor data from UAV and/or maps data indicates that a frequency of motorcycles exceeds a threshold | Activate motorcycle emulation light pattern |
| 5 | Ground based route segment active and IOT camera sensor data from UAV and/or data from system 180 indicates that traffic density is of traffic density classification 1 (lowest density) on a 1 to 5 scale | Disable emulation light pattern functionality |
| 6 | Ground based route segment active and IOT camera sensor data from UAV and/or data from system 180 indicates that traffic density is of traffic density classification 2 on a 1 to 5 scale | Activate reduced resolution emulation light pattern |
| 7 | Ground based route segment active and IOT camera sensor data from UAV and/or data from system 180 indicates that traffic density is of traffic density classification 3-5 on a 1 to 5 scale | Activate increased resolution emulation light pattern |
| 8 | Ground based route segment active and IOT sensor data from UAV and/or data from system 170 indicates ambient brightness classification of 1 (lowest brightness) on a scale of 1 to 3 | Activate lower level brightness emulation light pattern |
| 9 | Ground based route segment active and IOT sensor data from UAV and/or data from system 170 indicates ambient brightness classification of 2 on a scale of 1 to 3 | Activate medium level brightness emulation light pattern |
| 10 | Ground based route segment active and IOT sensor data from UAV and/or data from system 170 indicates ambient brightness classification of 3 on a scale of 1 to 3 | Activate highest level brightness light pattern |
| 11 | Ground based route segment active and social media sentiment analysis for geospatial area indicates that UAV tolerance exceeds a threshold AND road is a local road | Activate reduced resolution emulation light pattern |
| 12 | Ground based route segment active and social media sentiment analysis for geospatial area indicates that UAV tolerance does not exceeds a threshold AND road is a local road | Activate increased resolution emulation light pattern |

Referring to Table A, manager system 110 can use a decision data structure according to Table A for return of action decisions. Referring to Rows 1 and 2, manager system 110 can disable a GBV emulation mode when an aerial based route segment is active and can enable a GBV emulation mode when a ground based route segment is active. As set forth herein, a hybrid route can comprise one or more route segments and the route segments can include ground based segments and aerial based segments. Manager system 110 can be configured so that for the aerial based route segments a GBV emulation mode is disabled and for ground based segments the GBV emulation mode is enabled. When a GBV emulation mode is enabled, GBV can be emulated in operation and/or in appearance. A UAV emulating operation of a GBV can include the UAV adhering to vehicle traffic rules, e.g. staying in lanes, stopping at stop signs and at intersections in accordance with traffic light status, and the like, and can include the UAV maintaining flying height below a specified elevation and in one embodiment within a specified range of elevations, such as a range of within 1 and 10 feet according to one embodiment. A UAV emulating an appearance of a GBV can include the UAV projecting with projector system 122 fixed thereon a light pattern so that the UAV emulates the appearance of occupying a larger space. In some embodiments and/or use cases, a projected light pattern can emulate the appearance of a specific type of ground based motor vehicles such as a four-wheel vehicle such as a car or truck or a two-wheel vehicle, e.g. a motorcycle. Manager system 110 can determine whether an aerial based route segment is active or a ground based route segment is active by examining data of the currently established route established at block 1108 in reference to the UAV location data received at block 1109. When operating in a GBV emulation mode, manager system 110 can alter a vehicle type emulated by a light pattern projected by projector system 122 in dependence on processed data.

Referring to Row 3 of the decision data structure of Table A, manager system 110 can return an action decision to activate a baseline vehicle emulation light pattern where a ground based route segment is active and IoT camera sensor data from the UAV, e.g. UAV 120A, and/or maps data indicates that a frequency of motorcycles on the road being traveled does not exceed a threshold. Referring to Row 4 of Table A, manager system 110 can return an action decision to activate a motorcycle emulation light pattern when the condition is when a ground based route segment is active and IoT camera sensor data from a UAV and/or maps data indicates that a frequency of motorcycles exceeds a threshold. Embodiments herein recognize that a smaller sized light pattern with a reduced energy consumption rate can be suitable to indicate the presence of a UAV emulating a GBV where the current roadway frequently supports traffic by smaller sized vehicles. Thus, manager system 110 can examine image data representing the surroundings of a UAV to determine whether smaller sized vehicles, e.g. motorcycles are commonly in the presence of a UAV. Manager system 110 with reference to Rows 3 and 4 can alternatively examine data of maps data of maps area 2121 of data repository 108 that specifies different attributes of different roads, e.g. attributes in reference to vehicle types historically supported by such roads.

Figure 5:
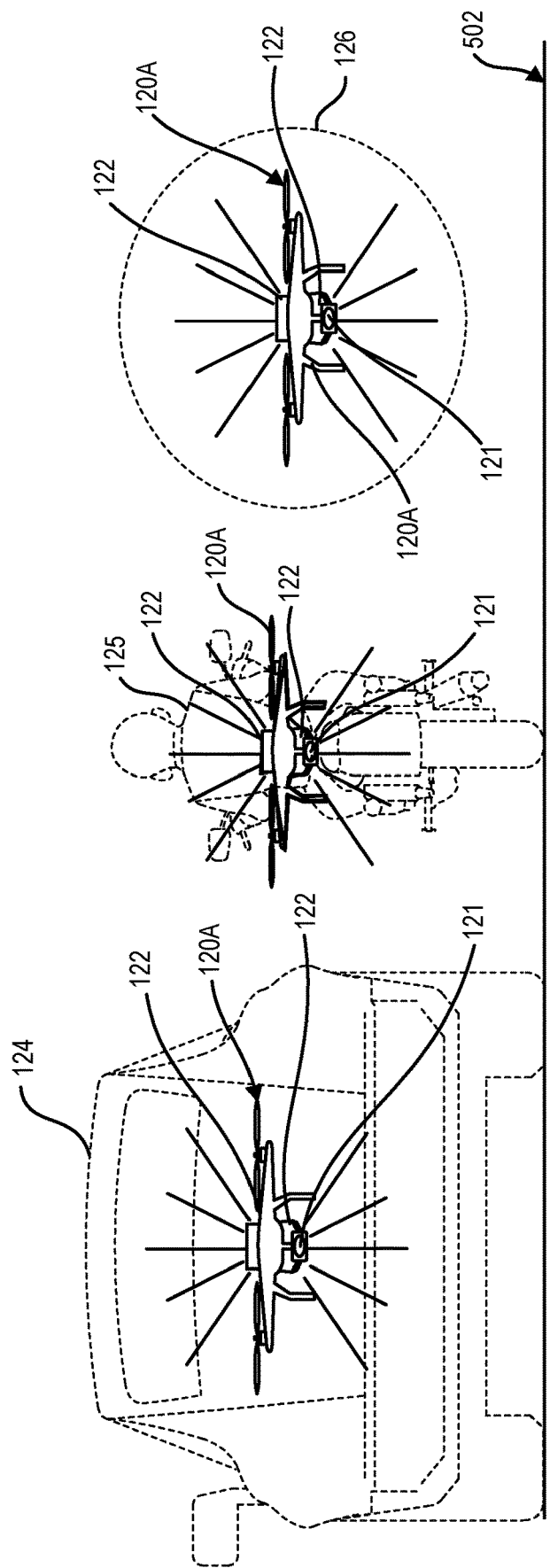
FIG. 5 depicts various light patterns that can be projected by a projector system of a UAV in a ground based vehicle (GBV) emulation mode according to one embodiment.

Referring to FIG. 5, light pattern 124 is a baseline light pattern in the form of a four-wheel vehicle light patterns, whereas light pattern 125 is a two-wheel vehicle light pattern provided by motorcycle light patterns. Light patterns 124 and 125 can be projected holographic image light patterns according to one embodiment. By reducing the size of a light pattern, manager system 110 can reduce an energy consumption rate associated with a light pattern. Manager system 110 projecting smaller light pattern 125 rather than larger light pattern 125 can yield safety advantages associated with projecting a light pattern indicative of a vehicle while reducing energy consumption. In FIG. 5 ground 502 depicts a ground elevation defined by a roadway.

Referring to Row 4 of Table A, where the condition is present that a current road does not frequently support motorcycles, manager system 110 can return an action decision to activate a baseline vehicle emulation light pattern, such as light pattern 124 emulating the appearance of a four wheel vehicle.

Referring to Rows 5, 6, and 7 of the decision data structure of Table A, manager system 110 can return action decision in respect to an emulation attribute in dependence on density of traffic of a current road being traversed in a GBV emulation mode by a UAV.

Referring to Row 5, manager system 110 using the decision data structure of Table A can return the action decision to disable emulate light pattern functionality on the condition that traffic density of a current roadway is of a lowest traffic density classification. Embodiments herein recognize that where there are zero or very few GBVs sharing a road with UAV operating in a GBV emulation mode, there may be little or no advantage yielded by the projection of a light pattern so that the UAV emulates the appearance of a GBV. Accordingly, referring to Row 5 of Table A, an action decision can be returned when specified conditions apply so that an energy consumption rate of UAV such as UAV 120A is reduced. Embodiments herein recognize that light patterns for emulation of different resolution may be suitable in dependence on a traffic density. Where traffic density is of classification 2 on a scale of 1 to 5 for example, a light pattern such as light pattern 126 depicted in FIG. 5 can be suitable to indicate to other drivers sharing a road with a UAV in a GBV emulation mode, the presence of the UAV.

Referring to light pattern 126 of FIG. 5, light pattern 126 can be a light pattern that emulates the appearance of a GBV by enlarging the apparent size of UAV 120A but light pattern 126 according to one embodiment can be of insufficient detail to define a discernable shape of a GBV of any certain type, e.g. can be of resolution insufficient to emulate a four wheel vehicle as distinguished from a two wheel vehicle, can be of resolution insufficient to emulate a two wheel vehicle as distinguished from a four wheel vehicle. Light patterns 124 and 125 (FIG. 5) on the other hand, can be higher resolution light patterns that define shapes of sufficient resolution so that a user can discern a vehicle type based on the light pattern. In other words, an observer observing light pattern 124 can discern that light pattern 124 is in the shape of a baseline four-wheel vehicle and can discern by observing light pattern 125 that light pattern 125 is in the shape of a travelling two-wheel vehicle, e.g. a motorcycle. Light patterns 124-126 as shown in FIG. 5 can be projected holographic images according to one embodiment and projector system 122 for projecting light patterns 124-126 can be a holographic projector system according to one embodiment. Projector system 122 can be configured to project light patterns of other discernible shapes mapping to specific vehicle types, e.g. in addition to "four wheel vehicle" and "two wheel vehicle" can project light patterns of discernible shapes mapping to such vehicle types as "car," "truck," "motorcycle," "moped," "scooter" and the like.

Figure 6:
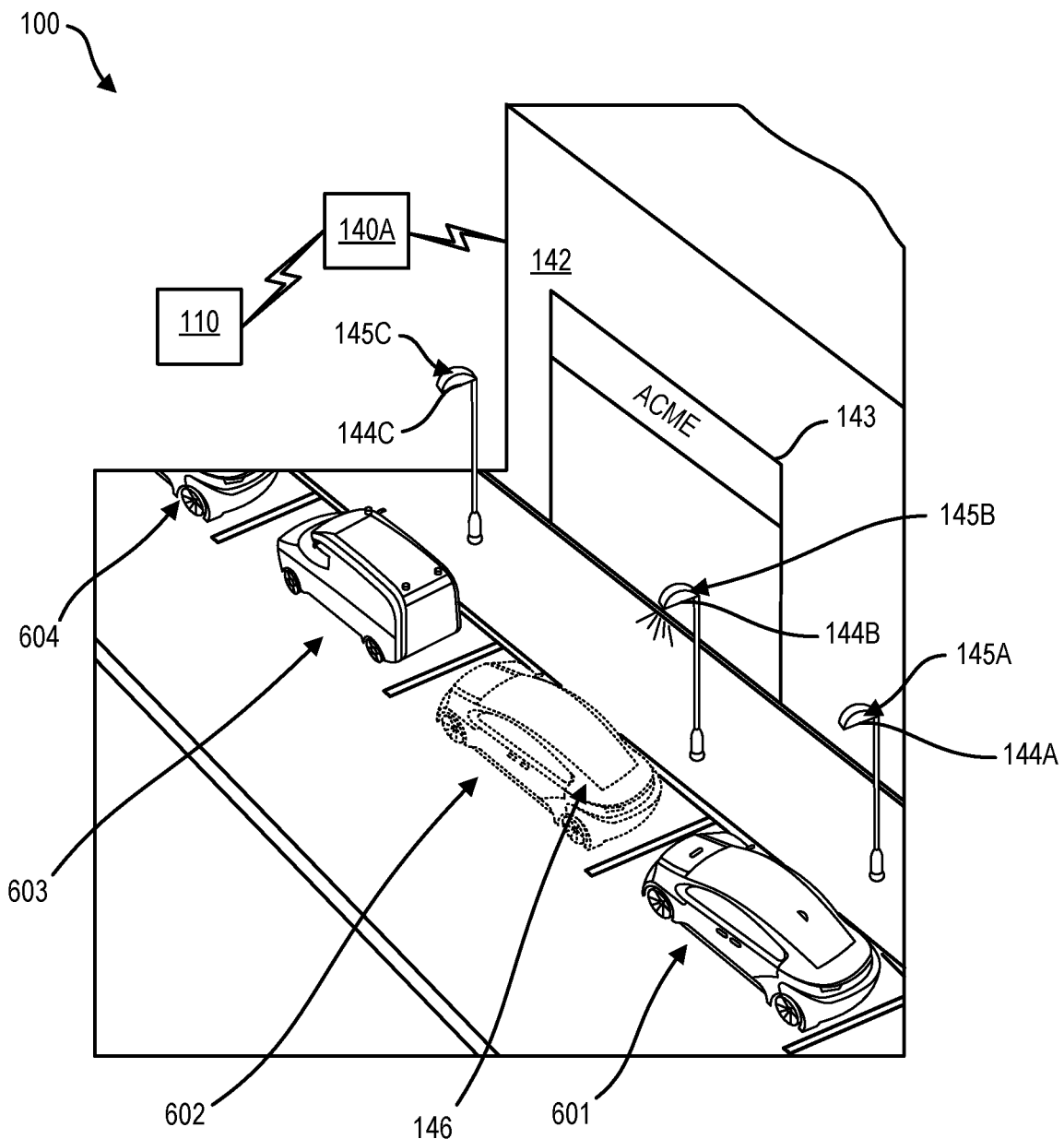
FIG. 6 depicts a physical form view of the system of FIG. 1 operating for control of a projected light pattern and control of a UAV at a destination location according to one embodiment.

Embodiments herein recognize that projection of lower resolution light pattern 126 as shown in FIG. 6, with reduced shape resolution can have a lower associated energy consumption rate than the projection of higher resolution light pattern 124 or light pattern 125. Accordingly, embodiments herein recognize that the lower resolution light pattern 126 can be advantageously projected according to one embodiment, when there is traffic density of lower density and a lower resolution light pattern may be suitable for indicating to other drivers sharing a road with a UAV to indicate the presence of UAV 120A. Embodiments herein also recognize that design requirements for projection of light pattern 126 can be relaxed as compared to design requirements for the projection of light pattern 124 or light pattern 125.

Accordingly, light pattern 126 can be projected using, e.g. lower cost light sources and optics. According to one embodiment, light pattern 124 can be projected with first components of light projector system 122, light pattern 125 can be projected with use of second components of light projector system 122, and light pattern 126 can be projected with use of third lowest cost components of light projector system 122. Embodiments herein also recognize that UAV 120A can be provided in a configuration in which UAV 120A is only capable of projecting light pattern of lower resolution light pattern 126 but is not capable of projecting light pattern 124 and light pattern 125. Such an embodiment can yield many of the advantages described with reference to system 100, but at lower cost.

Referring to Row 7 of the decision data structure of Table A, manager system 110 can return the action decision to active increased resolution emulation light pattern, e.g. light pattern 124 or 125 on the condition that traffic density exceeds a threshold, e.g. is of the traffic density classification 3-5 on a traffic density scale of 1-5.

Referring to Rows 8-10 of the decision data structure of Table A, manager system 110 can return action decisions to adapt a brightness of a projected light pattern in dependence on a determined brightness in an environment of a UAV such as UAV 120A. Referring to Rows 8-10, manager system 110 can determine brightness of an environment surrounding a UAV in multiple ways, e.g. can examine IoT sensor data from UAV 120A as received at block 1109. Alternatively or in addition, manager system 110 can examine data received at block 1112 from weather service system 170 indicating current brightness levels in an area surrounding UAV 120A. Embodiments herein recognize that under darker conditions a relatively low level of brightness projection may be sufficient to render a light pattern visible to an observer in viewing distance of the light pattern and conversely that under higher brightness ambient conditions a light pattern of a higher brightness level can be useful in rendering the light pattern visible to viewers in viewing distance of a light pattern. Accordingly, with reference to Rows 8-10, manager system 110 can return action decisions to adjust a brightness level associated with a projected light pattern in dependence on ambient brightness in an area of UAV 120A.

Referring to Row 11 and 12 of the decision data structure of Table A, manager system 110 can return action decision to adapt characteristics of a projected light pattern projected by projector system 122 in dependence on social media sentiment analysis.

Data received by manager system 110 at block 1105 according to one embodiment can include social media data, e.g. including posts data of social media system 150 by users such as registered users of system 100. Manager system 110 can process such social media system data to return sentiment parameter values. Manager system 110 according to one embodiment can subject social media system data including posts data to processing by activation of NLP process 116 to return sentiment parameter values associated to users of system 100 such as registered users of system 100. Manager system 110 can be configured to perform separate sentiment analyses for separate geospatial classifications of users. For example, a first sentiment analysis can be applied for a first user associated to a first geospatial region of a geospatial area and a second sentiment analysis can be applied for second users associated a second geospatial region of a geospatial area.

A user can by associated to a certain geospatial region e.g. by frequently visiting a location (e.g. home or work location) within a geospatial region. According to one embodiment, the sentiment analysis can include polar sentiment analysis associated with topic analysis. For example, according to one sentiment analysis scheme, manager system 110 can examine social media data and based on the analysis can flag topics having the topic classification UAV. Manager system 110 further, according to the described sentiment analysis can use NLP processing to return sentiment parameter values, e.g. positive or negative sentiment parameter values associated to the topic Topic=UAV. Polar sentiment analysis can be utilized, e.g. on a scale of −1.0 to +1.0, wherein the value 0.0 indicates a neutral sentiment. For performing sentiment analysis respecting a certain geospatial region within a geospatial area serviced by system 100, manager system 110 can aggregate return sentiment parameter values for social media posts by all users associated to a geospatial region. According to one embodiment, manager system 110 determining that users are associated to a region can include determining that the users have frequently visited a location (e.g. residence or work location) within the region.

Referring to Rows 11 and 12, manager system 110 can return an action decision in dependence on data returned by a sentiment analysis. Where users associated to a certain geospatial region associated to the current location of the UAV have greater tolerance in respect to UAVs, manager system 110 can return an action decision to project a lower resolution light pattern such as light pattern 1267 as shown in FIG. 5. Tolerance can be indicated by a returned aggregate sentiment value of users associated to the certain geospatial region returned by a sentiment analysis. A higher degree of tolerance can be indicated by a positive sentiment above a threshold value.

Referring to Row 12, manager system 110 can return an action decision to activate an increased resolution emulation light patter, such as light pattern 124 or 125 on the condition that UAV tolerance of users associated to the certain geospatial region does not exceed a threshold for a geospatial area associated to the road location currently occupied by the UAV, e.g. UAV 120A in the described example.

In reference to Rows 11 and 12, embodiments herein recognize that where social sentiment of users associated to a current geospatial region is less tolerant of a UAVs users within such geospatial region may prefer and may response more positively to a light pattern such as light pattern 124 and 125 in which a GBV is more realistically emulated. On completion of block 1112, manager system 110 can proceed to block 1113.

Referring to Rows 11 and 12, the firing condition can specify that the current road is a local road (as distinguished from a highway) as may be determined by query of data from maps area 2121. Embodiments herein recognize that controlling emulation based on geospatial sentiment can be more advantageous where driver viewers of the emulations are more likely to be local drivers.

At block 1113, manager system 110 can determine whether UAV 120A is approaching a destination location, i.e. location B in the described example. Manager system 110 for determining whether UAV 120A is approaching a destination can determine whether UAV 120A is within a threshold distance of a destination, e.g. 10 meters, 50 meters, 100 meters, 1000 meters, and the like. On the determination that UAV 120A is not approaching the destination manager system 110 can return to block 1107 to generate a next iteration of candidate routes from a current location of UAV 120A to the specified destination, e.g. destination location B in the described example. Manager system 110 can iteratively perform blocks 1107-1113 until manager system 110 determines that UAV 120A is approaching a destination, in which case manager system 110 can proceed to block 1114.

Referring to blocks 1107-1112 which can be iteratively performed, it can be seen that manager system 110 can be iteratively generating and examining new candidate routes throughout the time that UAV 120A travels from an origination location A to a destination location B. Various features can be understood with respect to manager system 110 iteratively performing blocks 1107-1112. For example, at block 1112, manager system 110 can be iteratively, i.e., for each iteration sending route data which can be potentially updated route data and/or control data which can be updated control data. It can be seen that based on received control data received by UAV 120A at block 1203, emulation attributes of UAV 120A can adaptively change while UAV 120A travels along a route from origination location A to destination location B. For example, with reference to FIG. 2 in the case that route 004 is selected.

Referring to the first segment of route 004 from location A to elbow 303 UAV 120A can be travelling in aerial mode for the first segment. Then at elbow 303 where UAV 120A transitions to a ground based route segment on the indicated roadway, UAV 120A can transition to a GBV emulation mode in which one or more of an operation or an appearance of a GBV is emulated. Attributes of an appearance of UAV 120A can adapt as UAV 120A travels along a ground based route segment of a route. For example, a pattern projected by projector system 122 can be transitioning between two or more of light pattern 124, light pattern 125, and light pattern 126 as depicted in FIG. 5, in dependence on processed data processed by manager system 110.

For example, resolution can change in dependence on traffic density, pattern brightness can change in dependence on detected ambient brightness level, and resolution can change in dependence on social sentiment in respect to UAVs in a geospatial region through which UAV 120A is travelling. Further, in reference to the loop depicted in respect to blocks 1107-1113, it can be seen that the candidate route scoring function of Eq. 1 can be iteratively applied and reapplied for new and different sets of candidate routes while a UAV 120A travels along a current route. During some, if not most, iterations the candidate route that is a continuation of the current route can be selected again and the selected route will not change from iteration to iteration. However, in some instances, embodiments herein recognize that a new and different route that is not a continuation of the current route out of a set of candidate routes can be selected.

Figure 3:
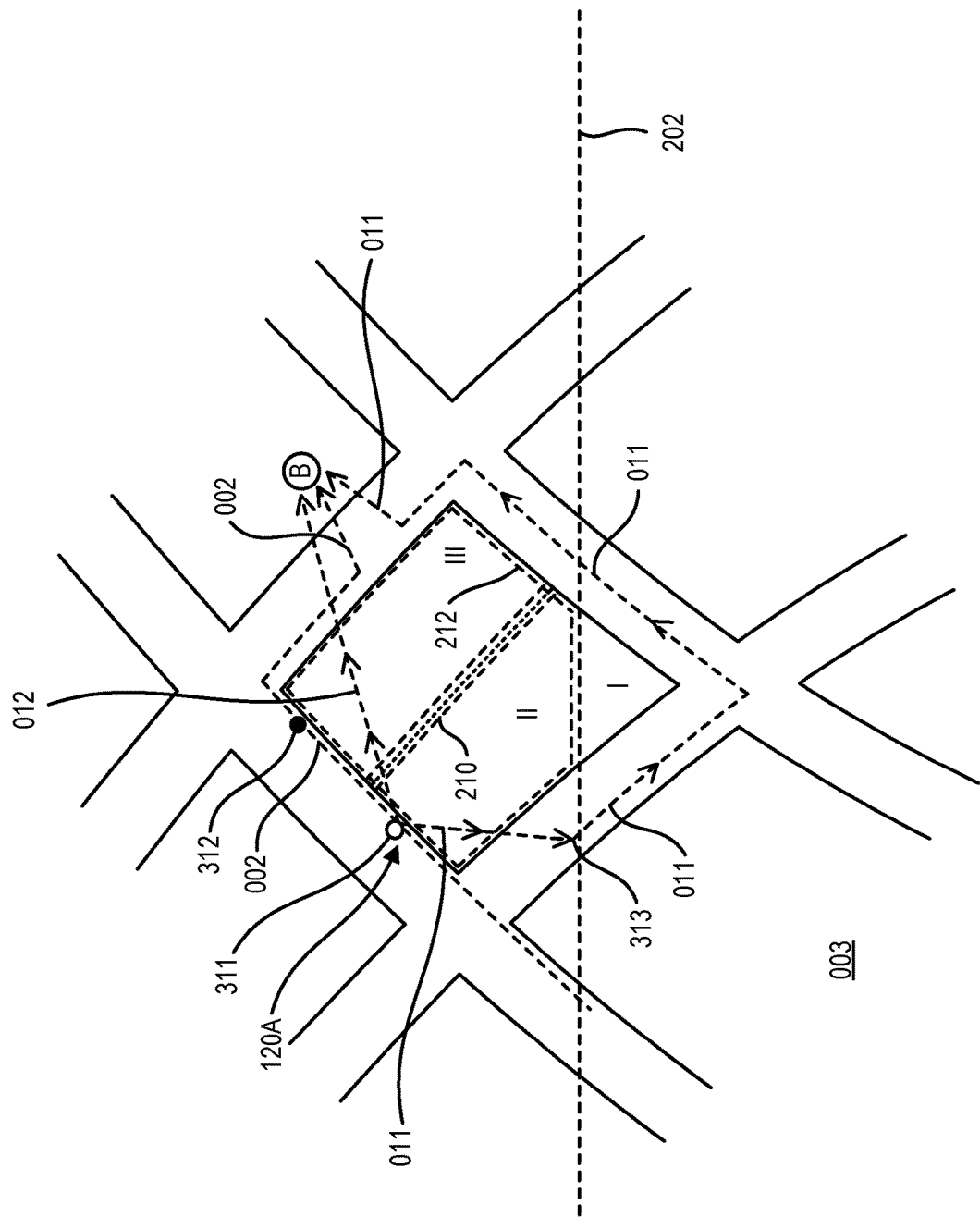
FIG. 3 is an exploded view of a portion of the roadway depicted in FIG. 2 according to one embodiment.

Referring to FIG. 3, UAV 120A can be travelling along route 002 and with UAV 120A at location 311 a traffic jam can occur at location 312. Ground traffic service system 180 can detect the traffic jam and, e.g. with route data or traffic data sent at block 1702 can send data indicating that the current route 002 will consume a longer period of time which will effect the scoring of the candidate route defining a continuation of the current route. Data indicating the traffic jam event can also be received with data received at block 1110. The candidate route defining a continuation of the current route can thus be allocated a reduced scoring value at block 1108 during an iteration of application of Eq. 1 to score candidate routes subsequent to manager system 110 obtaining data indicating that there is a traffic jam forward in the current route. Thus, manager system 110 at an iteration of block 1108 subsequent to a traffic jam event can score an alternative route that is note a continuation of the current higher than a route segment completing the current route that is a continuation of the current route. At block 1107 in this scenario described when there is a traffic jam event. In an iteration of blocks 1107 and 1108 subsequent to a traffic jam event, manager system 110 can generate new candidate routes at block 1107 and can examine the candidate routes, e.g. using Eq. 1 at block 1108.

At block 1107, manager system 110 can generate new candidate routes subsequent to a traffic jam such as candidate route 001 in which UAV 120A can exit the GBV emulation mode, enter an aerial navigation mode to fly over geospatial region II delimited by perimeter 210, commence travel on a ground based route segment at elbow 313, and remain travelling on the depicted roadway in a GBV emulation mode until destination location B is arrived at. According to candidate route 012, UAV 120A can at location 311 exit a GBV emulation mode and enter an aerial navigation mode to fly over a portion of region II, then fly over a portion of region III delimited by perimeter 212, and fly over the depicted road to arrive at the destination location B. Depicted route 012 in FIG. 3 is an aerial route the entire distance from location 311 to the destination location B.

Applying Eq. 1 to score route 001 and route 012, respectively, manager system 110 according to one embodiment can score the depicted longer route 011 higher than the depicted shorter route 012. For example, region III according to one embodiment can have metadata tags specified, e.g. in maps area 2121 specifying that region III is a residential area and conversely maps area 2121 can have metadata tags for region II indicating that region II is an unused commercial space region. Manager system 110, accordingly, can in one embodiment and according to factors $F_3$ and/or $F_4$ of Eq. 1 assign to route 012 low scoring values according to factors $F_3$ and $F_4$, aesthetics and safety, based on the route including a fly over of a region specified in maps area 2121 as being a residential area. In the described scenario, route 001 can be established as the selected route and UAV 120A on the detection of a traffic jam at location 312 can responsively exit its current GBV emulation mode and enter into an aerial navigation mode to arrive at elbow 313 and then transition again into a GBV emulation mode and remain in the GBV emulation mode travelling on the depicted roadway until destination location B is arrived at. It will be understood that in another scenario where region III has metadata tags indicating that region III is an unused commercial space region, route 012 might be selected over route 001.

On determining that a destination is being approached at block 1113, manager system 110 can proceed to block 1114. In the case that a destination, such as destination location B as shown in FIGS. 2 and 3, is an enterprise venue, manager system 110 at block 1114 can be receiving data from an enterprise system such as enterprise system 140A of enterprise systems 140A-140Z. As shown in FIG. 4B, enterprise system 140A can be iteratively sending IoT sensor data for receipt by manager system 110 at block 1114. Enterprise system 140A can be iteratively sending IoT sensor data at block 1401.

Figure 7:
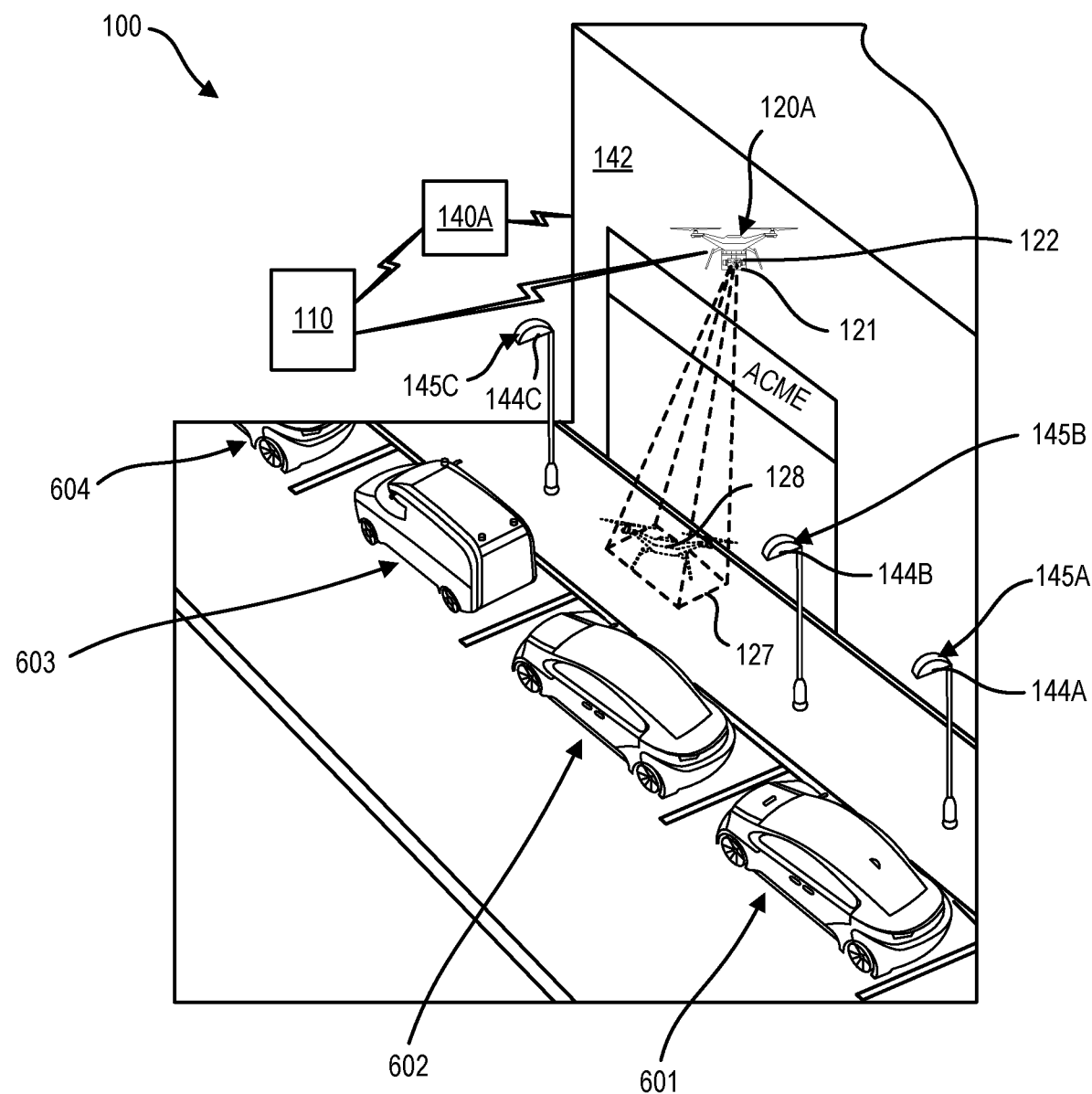
FIG. 7 depicts a physical form view of the system of FIG. 1 operating for control of one or more light pattern and a UAV at a destination location according to one embodiment.

Referring to FIGS. 6 and 7, an IoT sensor system can be in communication with venue 142 having a plurality of IoT sensors. For example, venue 142 can have IoT sensors 144A, 144B, and 144C distributed throughout infrastructure associated to venue 142. IoT sensors 144A, 144B, and 144C in FIGS. 6 and 7 are shown as being distributed on poles associated to venue 142, namely on poles associated to a frontage area of venue 142 but could alternatively be distributed in other areas such as on exterior walls defining venue 142. In the described embodiment shown in reference to FIGS. 6 and 7, IoT sensors 144A-144C can be disposed to sense the presence of vehicles in vehicle parking area 601, 602, 603, and 604. Manager system 110 on completion of block 1114 to receive IoT sensor data from IoT sensors associated to venue 142 can proceed to block 1115.

At block 1115, manager system 110 can determined whether there is an open vehicle parking space associated to venue 142. Referring to FIG. 6, manager system 110 at block 1115 according to one scenario can determine that there is in fact an open vehicle parking area associated to venue 142, namely open parking area 602. In response to a determination at block 1115 that there is a vehicle parking space available, manager system 110 can proceed to block 1116.

At block 1116, manager system 110 can perform virtual parking to virtually park a virtual vehicle in an open parking spot determined to exist at block 1115. Referring to FIG. 6, manager system 110 at block 1116 can perform virtual parking to park a virtual vehicle in open parking spot 602. For performing virtual parking, manager system 110 at virtual parking block 1116 can send control data for receipt by enterprise system 140A at block 1402. On receipt of the control data received at block 1402, enterprise system 140A with reference to FIG. 6 can activate an appropriate one of projectors associated to venue 142. With reference to FIG. 6, venue 142 can have associated projectors 145A, 145B, and 145C associated to venue 142. Projector 145A can be associated to parking spot 601, projector 145B can be associated to parking spot 602, and projector 145C can be associated to parking spot 603. At block 1402, enterprise system 140A can receive sent control data to control the projector associated to open parking spot 602 determined to be present at block 1115. In response to the received control data received at block 1402, enterprise system 140A can activate projector 145B. Projector 145B, when activated by the received control data can project light pattern 146.

Light pattern 146 can be a light pattern which, when active, emulates the appearance of a motor vehicle in parking spot 602. Therefore, when drivers driving on a roadway in front of venue 142 view open parking spot 602 such drivers will observe open parking spot 602 as an occupied parking spot based on light pattern 146 emulating the appearance of a parked vehicle occupying the spot. Light pattern 146 therefore reserves open parking spot 602 for the safe and open landing of UAV 120A. Projectors 145A, 145B, and 145C associated to respective parking spots 601, 602, and 603 can be mounted on mounting poles as shown installed at a frontage area associated to venue 142 but could also alternatively be installed in other infrastructure of venue 142 such as exterior walls defining venue 142. IoT sensor 144A can be associated to parking spot 601 for the detection of occupancy of parking spot 601, IoT sensor 144B can be associated to parking spot 602 for the detection of occupancy of parking spot 602, and IoT sensor 144C can be associated to parking spot 603 for the detection of occupancy of parking spot 603. Projectors 145A, 145B, and 145C for projecting light patterns such as light pattern 146 emulating the appearance of a vehicle can be holographic projections and light patterns such as light pattern 146 can be holographic projections.

Returning to the flowchart of FIG. 4B, manager system 110 on determining that no parking space is available at block 1115 can proceed to block 1117. At block 1117, manager system 110 can perform a landing area projecting process that is described in reference to FIG. 7. In a GBV emulation mode UAV 120A as set forth herein can be travelling in a manner to emulate the operation of a motor vehicle and can be travelling, e.g. at a modest distance from a ground level and at a substantially consistent distance from the ground level, according to one embodiment in a GBV emulation mode can be travelling at a substantially constant distance from the ground at about 1M, in one embodiment within a range of from about 0.5M to about 2M, and in another embodiment within a range of distances from the ground elevation of from about 0.3M to about 3M.

For performing landing area projecting at block 1117 manager system 110 can generate control data for sending to UAV 120A so that the elevation of UAV 120A increases from a ground elevation, e.g. so that UAV 120A may elevate to a distance of, e.g. greater than about 3M and in one embodiment greater than about 5M, and in one embodiment greater than about 7M and in one embodiment greater than about 10M from the ground. Embodiments herein expect that in performance of pickup or delivery it can be advantageous so that UAV 120A eventually lands at a location which at various times can be occupied by members of a human population, e.g. pedestrians traversing a frontage area such as a store front as may be represented by venue 142, which can be a retail venue according to one embodiment. Accordingly, a landing area projecting process of block 1117 can be carried out in a manner to protect the safety of potential pedestrians below in an eventual landing area of UAV 120A and therefore can include sending control data to UAV 120A for receipt in activation by UAV 120A at block 1204 so that UAV 120A is previously operating in a GBV emulation mode advances to a safe elevation so as not to interfere with pedestrians who may be walking below.

With elevation control data sent at block 1117 for receipt and activation at block 1204 by UAV 120A there can be send control data to control an attribute of a light pattern that can be projected by projector system 122 of UAV 120A as depicted in FIG. 7. On receipt of control data received at block 1204, UAV 120A can perform a landing area projecting process. The landing area projecting process can include, e.g. UAV 120A if previously operating in a GBV emulation mode increasing a height elevation thereof to an elevation, e.g. of greater than about 3M and in one embodiment greater than about 5M, and in one embodiment greater than about 7M and in one embodiment greater than about 10M and can include UAV 120A in response to the received control data received at block 1204 activating projector system 122 of UAV 120A so that a light pattern e.g. one or more of light pattern or light pattern 128 as shown in FIG. 7 is projected to indicate an eventual landing area of UAV 120A.

As depicted in FIG. 7, UAV 120A can be flying at a substantially high elevation, e.g. higher than about 7M and can project below UAV 120A one or more light pattern e.g. light pattern 127 and/or light pattern 128. Prior to sensing of control data for projecting of a light pattern 127 and/or 128 manager system 110 can be examining data from IOT sensor system 121 of UAV 120A. The IOT sensor data can be IOT sensor data e.g. received at block 1109 indicated a presence or absence of one or more member of the human population at an area below UAV 120A to be occupied by the one or more light pattern 127 and/or 128. Manager system 110 can be configured so that manager system 110 activates control data for the activation of light pattern 127 and/or light pattern 128 conditionally on the condition that examination of IOT sensor data of UAV 120A indicates that an area to be occupied by light pattern 127 and/or 128 is not occupied by any person.

Light patterns projected can include light pattern 127 which can be a border light pattern that is projected on a ground, e.g. a road or a sidewalk to indicate a perimeter of an eventual landing area of a UAV 120A. A projected light pattern projected by projector system 122 of UAV 120A as shown in FIG. 7 in response to control data received at block 1204 can in addition or alternatively include light pattern, which is a light pattern that emulates the appearance of UAV 120A. With light pattern 127 and/or light pattern 128 being active, a pedestrian in viewing area of light pattern 127 and/or 128 will view light pattern 127 and/or 128 and can discern based on the light pattern that UAV 120A will be landing in the near future and so human population members in viewing area of pattern 127 and/or 128 will know to avoid the location indicated by pattern 127 and/or 128 and stay a safe distance away from light pattern 127/128. UAV 120A in response to received control data at block 1204 can then complete a safe landing in the landing area indicated by light pattern 127 and/or 128 without causing harm to members of the human population below before UAV 120A lands. According to one embodiment, projector system 122 can be a holographic projector system and light pattern 127 and/or light pattern 128 can be projected holographic images. Projected holographic images herein can be three-dimensional (3D) projected holographic images.

With further reference to the flowchart of FIGS. 4A and 4B, manager system 110 on completion of block 1116 or alternatively 1117 can proceed to block 1118. With light pattern 146 (FIG. 6) and/or one or more of light pattern 127 and/or 128 projected manager system 110 can perform block 1118, wherein manager system 110 can receive location data sent by UAV 120A at block 1205 and can at block 1118 and block 1119 monitor a current location of UAV 120A. At block 1119, manager system 110 can determine whether UAV 120A has achieved its specified destination, e.g. destination location B in the described example described in reference to FIGS. 2 and 3 and as shown in FIGS. 6 and 7 according to one example. UAV 120A achieving its destination location can include manager system 110 determining that UAV 120A has landed in open parking spot 602 as shown in FIG. 6 or has landed in the location depicted by light pattern 127 or light pattern 128 as shown in FIG. 7. Where manager system 110 determines at block 1119 that a destination has not been achieved, manager system 110 can proceed to block 1120.

At block 1120, manager system 110 can adjust a location of UAV 120A and can return to block 1118 and can iteratively perform blocks 1118-1120 until manager system 110 determines that a destination has been achieved. Manager system 110 at block 1120 can send control data for adjusting the location of UAV 120A. UAV 120A can receive the control data sent at block 1120 at block 1206 and can respond to the control data by adjusting its location. Manager system 110 can iteratively perform blocks 1118-1120 until UAV 120A achieves its destination location. When manager system 110 determines at block 1119 that a destination location has been achieved, manager system 110 can proceed to block 1121.

At block 1121, manager system 110 can send control data for receipt by enterprise system 140A at block 1403 and can send control data at block 1121 for receipt by UAV 120A at block 1207. In response to the received control data received at block 1403 enterprise system 140A can deactivate light pattern 146 (FIG. 6) if light pattern 146 has been projected at block 1116. UAV 120A in response to control data received at block 1207 can deactivate by projector system 122, one or more of light pattern 127 or light pattern 128 (FIG. 7) if light pattern 127 and/or light pattern 128 was previously activated at block 1117. Manager system 110 on completion of block 1121 can proceed to block 1122. At block 1122, manager system 110 can return to block 1106 so that manager system 110 can receive next trip request data in respect to UAV 120A or another UAV of UAVs 120A-120Z. Manager system 110 can be performing iterations of the loop of 1107-1122 for multiple UAVs of UAVs 120A-120Z concurrently.

There is set forth herein according to one embodiment a cognitive method to determine the type of light pattern e.g. which can be 3D holographic projection of a vehicle to project from an unmanned aerial vehicle (UAV) around itself and package it is carrying such that the UAV can navigate in traffic similar visually to a ground based vehicle (e.g. a car, truck, or motorcycle) and perform delivery using existing roadways.

The cognitive system can evaluate the following streaming data sources at runtime: (a) government (Federal, State, Local) requirements for vehicle type/size e.g. from an enterprise system of enterprise systems 140A-140Z provided by an enterprise system operated by a government entity; (b) Realtime streaming data and conditions such as traffic level, cultural norm for location (i.e. small car, motor bike, etc.); (c) one or more camera sensor (e.g. UAV disposed or external to a UAV) to observe other vehicles on roadway, social sentiment of vehicle type for roadway.

There is set forth herein according to one embodiment a method of observing from UAV IoT camera sensor prior to landing that a space is clear, and projecting a light pattern e.g. provided by a holographic projection of landing spot at delivery location to alert nearby people.

Embodiments herein can feature a UAV having a projector system to project a light pattern e.g. a holographic projection. Embodiments can feature e.g. location awareness communication, mapping software, centralized monitoring, sensors to communicate with autonomous vehicles, and/or sensors to detect presence of vehicles There is set forth herein components to determine in real time from streaming data sources (e.g. government repository of regulations and/or restrictions such as a DOT or police accident repository, weather, social sentiment of UAVs on roadway), when to project a light pattern e.g. a holographic projection of a ground based vehicle while navigating roadway. There is set forth herein components to determine type of autonomous vehicle projected holographically (i.e. small car, motorbike) based e.g. on current conditions, cultural norms, roadway size.

A UAV can be configured with use of government (Federal, State, Local) flight regulations streaming data. A UAV can be configured with use of cultural norm streaming data for determination of expected vehicle type for specific roadways. The expected vehicle type based on detected cultural norms can be observed and changed in real-time as well. A UAV can be equipped with the same type of communications sensors and devices of an autonomous vehicle such that it can perform coordinated actions such as turning, stopping, and adhering to vehicle traffic rules, e.g. staying in lane, stopping at stop signs and at intersections based on status of a traffic light. The UAV in a GBV emulation mode can follow vehicle traffic rules of the road like an autonomous vehicle. A route for delivery can be mapped and sent to UAV for delivery.

Software can determine when a light pattern such as a holographic image of vehicle should be projected for emulation of a GBV based on following exemplary conditions: (1) a mapped route may have requirement for type of vehicle and a projected light pattern can be controlled to adhere to the requirement; (2) Camera or sensor based identification of vehicles nearby so that the projected light pattern adheres to the observed cultural norms as detected by processing of camera obtained data; (3) Cognitive system analysis of streaming data sources (e.g. weather, accidents, social sentiment of drones on roadway, etc.). As the UAV navigates the delivery roadway system, the light pattern e.g. holographic projection by a UAV to emulate the appearance of a GVB such as an autonomous vehicle will be projected based on the defined criteria.

There is set forth herein a method of observing from a UAV IOT sensor system e.g. a camera thereof prior to landing that space is clear, and projecting a light pattern e.g. a holographic projection to highlight a landing spot at a delivery location to alert nearby people. A camera on the UAV can observe the target location for delivery. System 100 can locate a space for safe delivery that has the appropriate amount of space for the UAV landing and package for delivery. Consideration is needed for other packages the UAV may be carrying. The UAV can project a light pattern e.g. a holographic projection onto the space on the ground where the UAV plans to land to alert people of the impending landing.

Certain embodiments herein may offer various technical computing advantages involving computing advantages to address problems arising in the realm of computer networks and computer systems and particularly in computing environments involving location based services (LBS) and unmanned aerial vehicles (UAVs). Embodiments herein can include control of a UAV so that functions of the UAV can adapt in dependence on location of the UAV. A UAV herein can be controlled to enter into a ground based vehicle (GBV) emulation mode in which the UAV emulates a GBV. Emulation of a GBV by a UAV can include emulation of operation of a GBV and/or emulation of an appearance of a GBV. A UAV can include a system for projecting a light pattern for emulation of an appearance of a GBV. A UAV by a projector system thereof can project a light pattern so that the UAV emulates the appearance of a GBV. Embodiments herein can include control of a UAV so that emulation attributes of a UAV are in dependence on returned action decisions, wherein the returned action decisions are returned with use of artificial intelligence (AI) processes. Various decision data structures can be used to drive artificial intelligence (AI) decision making, such as a decision data structure that cognitively maps social media interactions in relation to posted content in respect to attributes of a projected light pattern for emulation of a GBV. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 8:
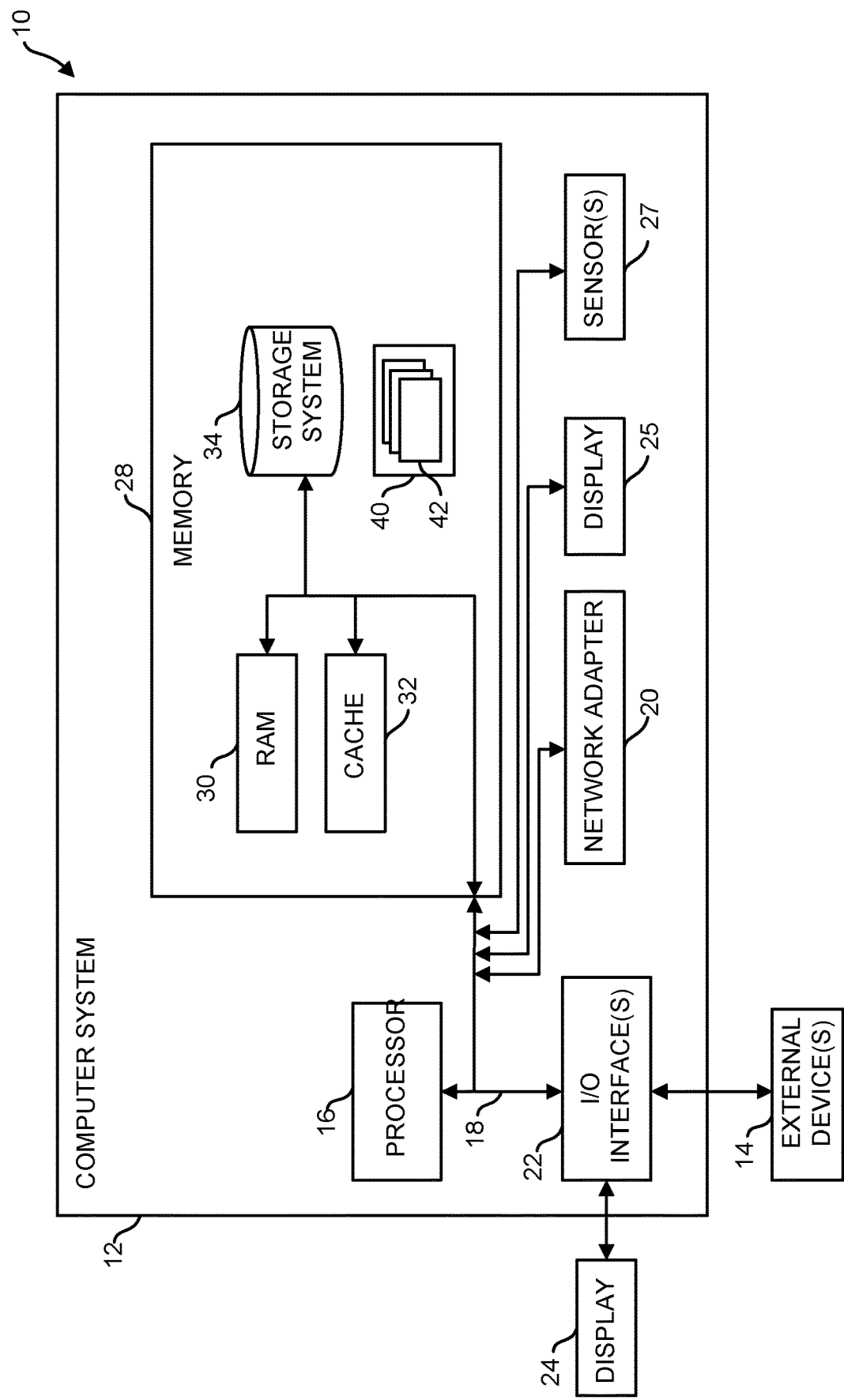
FIG. 8 depicts a computing node according to one embodiment.
Figure 9:
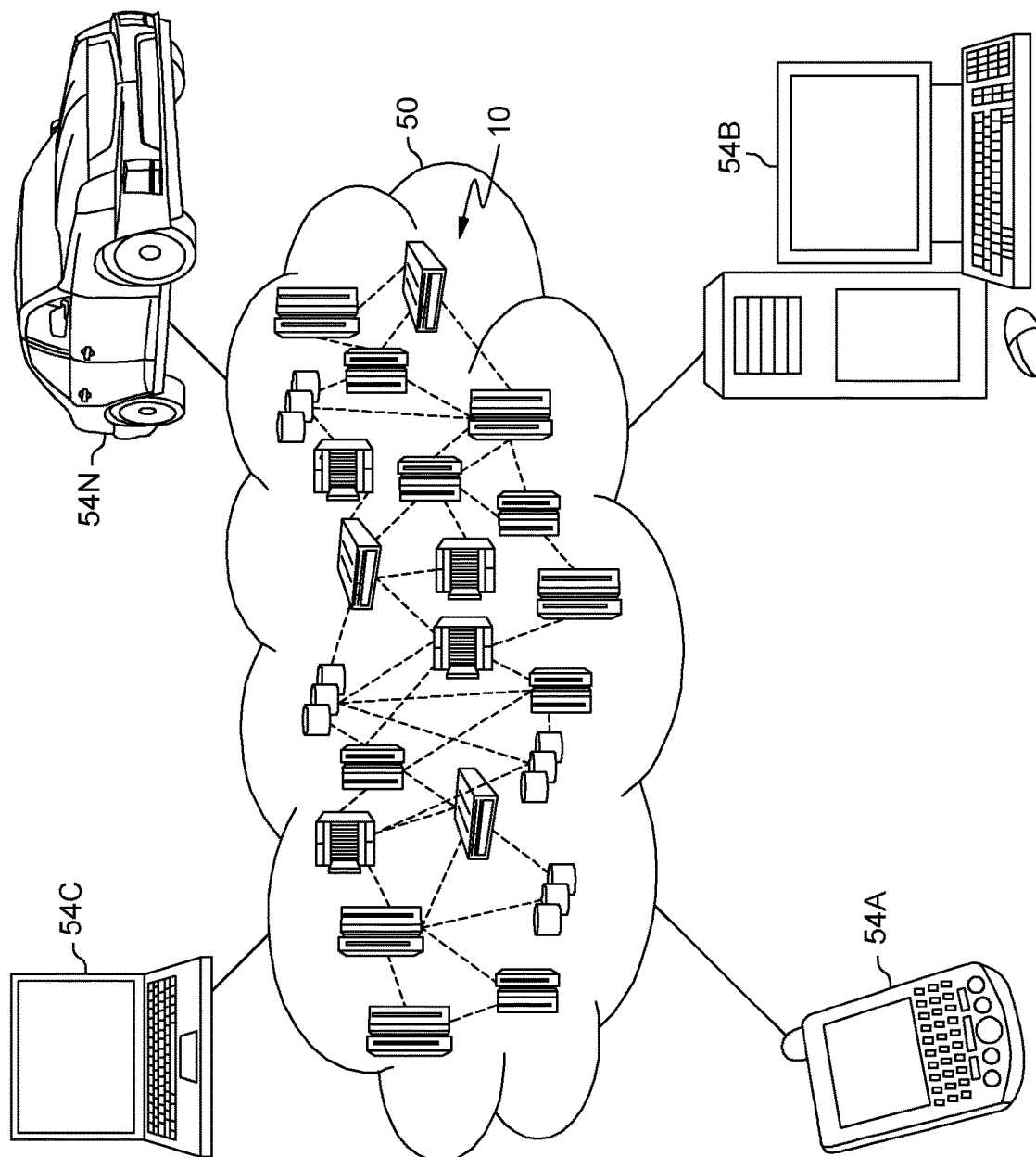
FIG. 9 depicts a cloud computing environment according to one embodiment.
Figure 10:
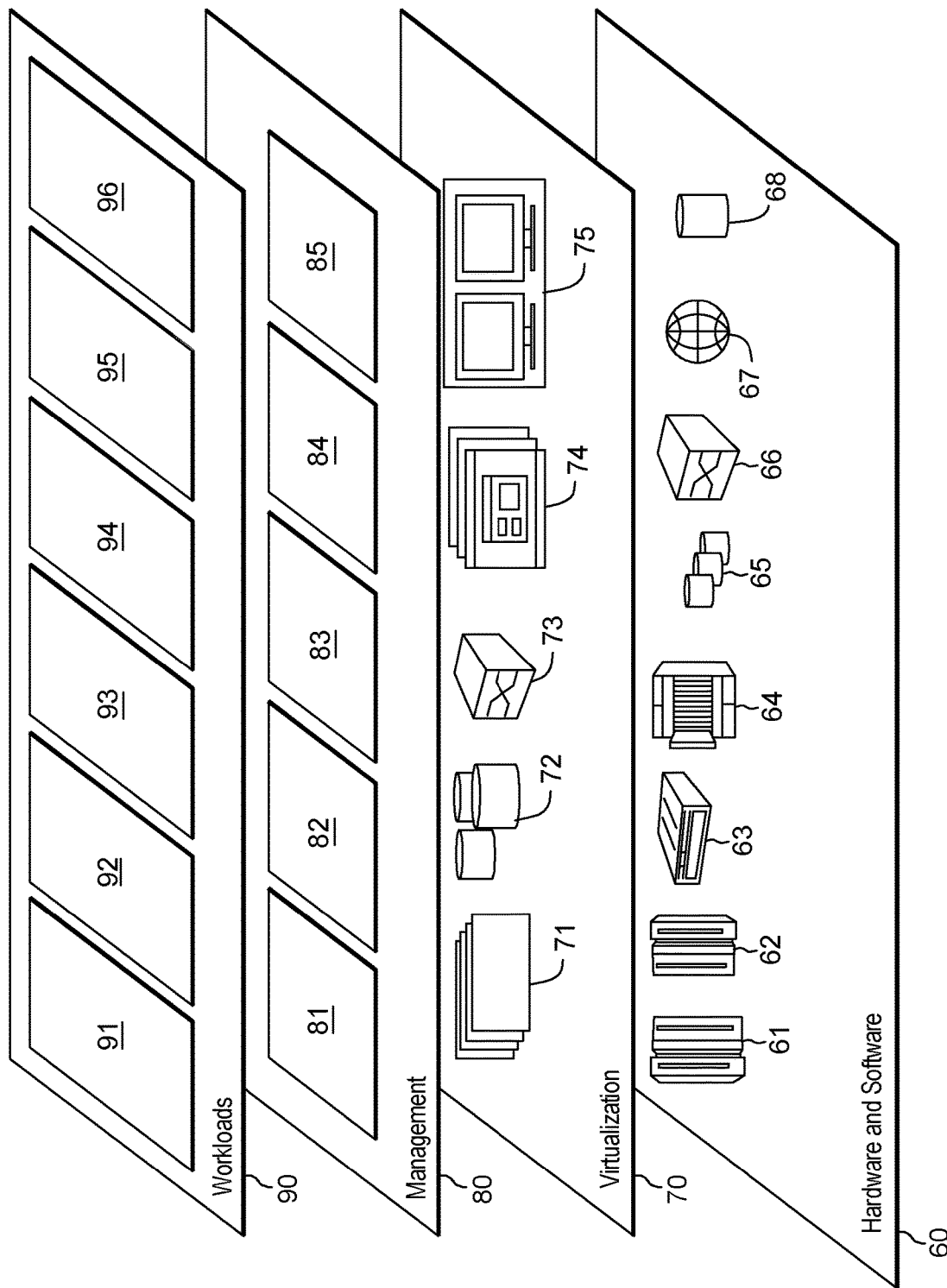
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions functions described with reference to manager system 110 as set forth in the flowchart of FIGS. 4A-4B. In one embodiment, respective UAVs 120A-120Z can include one or more computing node 10 and can include one or more program 40 for performing functions described with reference to UAV as set forth in the flowchart of FIGS. 4A-4B. In one embodiment, one or more client computer device 130A-130Z can include one or more computing node 10 and can include one or more program 40 for performing functions described with reference to one or more client computer device 130A-130Z as set forth in the flowchart of FIGS. 4A-4B. In one embodiment, systems 150, 160, 170, 180, 182 can include one or more computing node 10 and can include one or more program 40 for performing functions described with reference to systems 150, 160, 170, 180, 182 as set forth in the flowchart of FIGS. 4A-4B. In one embodiment, the computing node based systems and devices depicted in FIG. 1, FIG. 6, and FIG. 7 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for controlling an unmanned aerial vehicle (UAV) as set forth herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

The invention claimed is:

1. A computer implemented method comprising: examining data specifying a plurality of alternative candidate routes for travel by an unmanned aerial vehicle (UAV) from a current location of the UAV to a destination location; selecting one of the alternative candidate routes as a selected route for travel by the UAV; and controlling the UAV so that while the UAV travels along the selected route the UAV emulates a ground-based vehicle (GBV), wherein the controlling the UAV includes controlling the UAV so that the UAV operates in a GBV emulation mode, wherein the GBV emulation mode is characterized by the UAV emulating appearance of a GBV, the emulating including projecting a holographic light pattern, the holographic light pattern having a shape of a four wheel motor vehicle.

2. The computer implemented method of claim 1, wherein the GBV emulation mode is characterized by the UAV emulating operation of a GBV.

3. The computer implemented method of claim 1, wherein the GBV emulation mode is characterized by the UAV emulating operation of a GBV, the emulating including the UAV adhering to vehicle traffic rules.

4. The computer implemented method of claim 1, wherein the GBV emulation mode is characterized by the UAV ernuiating operation of a GBV by maintaining a fixed flight elevation, the fixed flight elevation characterized by a low elevation and a high elevation of the UAV over a course of travel of more than 10M having a difference of no more than about 1M, and the elevation of the UAV being less than about 3M.

5. The computer implemented method of claim 1, the emulating including the UAV projecting the light pattern in an area about the UAV to enlarge an apparent size of the UAV.

6. The computer implemented method of claim 1, wherein method includes (a) controlling the UAV to travel along the selected route in a GBV emulation mode in which the UAV adheres to traffic rules, and in which the UAV projects the light pattern about itself to emulate an appearance of a GBV; (b) obtaining data of a traffic condition ahead of a current location of the UAV; and (c) in response to the traffic condition controlling the UAV to operate in an aerial navigation mode in which the UAV aerially navigates away from the a roadway currently occupied by the UAV in the GBV emulation mode to avoid the traffic condition.

7. The computer implemented method of claim 1, wherein the GBV emulation mode is characterized by the UAV emulating operation of a GBV, the emulating including the UAV adhering to vehicle traffic rules, the emulating including the UAV projecting the light pattern in an area about the UAV to enlarge an apparent size of the UAV.

8. The computer implemented method of claim 1, wherein the GBV emulation mode is characterized by the UAV emulating operation of a GBV by maintaining for a distance of at least about 10M along a roadway a flight elevation of no more than about 5M, and for the distance of at least about 10M along the roadway maintaining a position of the UAV within a lane of a roadway.

9. The computer implemented method of claim 1, wherein the examining data specifying a plurality of alternative candidate routes include examining data of (a) one or more aerial candidate route for travel by the UAV exclusively in an aerial navigation mode by the UAV, (b) one or more ground based candidate route for travel by the UAV exclusively in a GBV emulation navigation mode, and (c) one or more hybrid candidate route for travel by the UA, each of the one or more hybrid candidate route including at least one aerial based route segment for travel by the UAV exclusively in an aerial navigation mode, and at least ground based route segment for travel by the UAV exclusively in a GBV emulation navigation mode.

10. The computer implemented method of claim 1, wherein the method includes detecting traffic density in an area about a current location of the UAV, the emulating including the UAV projecting the light pattern in an area about the UAV to enlarge an apparent size of the UAV, wherein the controlling the UAV includes controlling the light pattern in dependence on the detected traffic density in the area about the location of the UAV.

11. The computer implemented method of claim 1, wherein the method includes detecting ambient brightness in an area about a current location of the UAV, the emulating including the UAV projecting the light pattern in an area about the UAV to enlarge an apparent size of the UAV, wherein the controlling the UAV includes controlling the light pattern in dependence on the detected ambient brightness in the area about the current location of the UAV.

12. The computer implemented method of claim 1, wherein the method includes detecting a frequency of a vehicle type in an area about a current location of the UAV using image data of an IoT camera sensor of the UAV, the emulating including the UAV projecting the light pattern in an area about the UAV to enlarge an apparent size of the UAV, wherein the controlling the UAV includes controlling the light pattern in dependence on the frequency of the vehicle type in the area about the current location of the UAV.

13. The computer implemented method of claim 1, wherein the method includes detecting social sentiment of persons associated to a region encompassing a current location of the UAV, the emulating including the UAV projecting the light pattern in an area about the UAV to enlarge an apparent size of the UAV, wherein the controlling the UAV includes controlling the light pattern in dependence on the social sentiment of persons associated to the region encompassing the current location of the UAV.

14. The computer implemented method of claim 1, wherein the method includes is characterized by one or more of the following selected from the group consisting of (a) determining that the UAV is approaching the destination, and in response to the determining activating a projector to project the light pattern in an area of a vehicle parking space at the destination, the light pattern emulating an appearance of a four wheeled motor vehicle parked at the vehicle parking space and (b) determining that the UAV is approaching the destination, and in response to the determining activating a projector system of the UAV to project a light pattern in an area at the destination, the light pattern indicating an area for landing by the UAV.

15. The computer implemented method of claim 1, wherein the examining and selecting are iteratively performed, and wherein the method includes in response the examining controlling the UAV so that navigation mode of UAV transitions from GBV emulation mode to an aerial navigation mode, wherein the examining includes shoring routes of the plurality of candidate routes based on multiple factors that include (a) time to travel to the destination; (b) energy consumption, (c) aesthetic impact; and (d) safety.

16. The computer implemented method of claim 1, wherein the GBV emulation mode is characterized by the UAV emulating operation of a GBV by maintaining a fixed flight elevation, the fixed flight elevation characterized by a low elevation and a high elevation of the UAV over a course of travel of more than 10M having a difference of no more than about 1M, and the elevation of the UAV being less than about 3M, wherein the method includes determining that the UAV is approaching the destination, and in response to the determining activating a projector system of the UAV to project light pattern in an area at the destination, the light pattern indicating an area for landing by the UAV, wherein the examining data specifying a plurality of alternative candidate routes include examining data of (a) one or more aerial candidate route for travel by the UAV exclusively in an aerial navigation mode by the UAV, (b) one or more ground based candidate route for travel by the UAV exclusively in a GBV emulation navigation mode, and (c) one or more hybrid candidate route for travel by the UA, each of the one or more hybrid candidate route including at least one aerial based route seament for travel by the UAV exclusively in an aerial navigation mode, and at least ground based route segment for travel by the UAV exclusively in a GBV emulation navigation mode.

17. The computer implemented method of claim 1, wherein the controlling the UAV includes controlling the light pattern in dependence on detected traffic density in an area about the location of the UAV.

18. A system comprising: a memory; at least one processor in communication with the memory; and program instructions executable by one or more processor via the memory to perform a method comprising: examining data spec-lying a plurality of alternative candidate routes for travel by an unmanned aerial vehicle (UAV) from a current location of the UAV to a destination location; selecting one of the alternative candidate routes as a selected route for travel by the UAV; and controlling the UAV so that while the UAV travels along the selected route the UAV emulates a ground based vehicle (GBV), wherein the controlling the UAV includes controlling the UAV so that the UAV operates in a GBV emulation mode, wherein the GBV emulation mode is characterized by the UAV emulating appearance of a GBV, the emulating including projecting a holographic light pattern, the holographic light pattern having a shape of a four wheel motor vehicle.

19. The system of claim 18, wherein the controlling the UAV includes controlling the light pattern in dependence on detected traffic density in an area about the location of the UAV.

20. A computer program product comprising: a computer readable storage medium readably by one or more processing circuit and storing instructions for execution by one or more processor for performing a method comprising: examining data specifying a plurality of alternative candidate routes for travel by an unmanned aerial vehicle (UAV) from a current location of the UAV to a destination location; selecting one of the alternative candidate routes as a selected route for travel by the UAV; and controlling the UAV so that while the UAV travels along the selected route the UAV emulates a ground based vehicle (GBV), wherein the controlling the UAV includes controlling the UAV so that the UAV operates in a GBV emulation mode, wherein the GBV emulation mode is characterized by the UAV emulating appearance of a GBV, the emulating including projecting a holographic light pattern, the holographic light pattern having a shape of a four wheel motor vehicle.

\* \* \* \* \*